(12) United States Patent
Beristany et al.

(10) Patent No.: US 11,777,294 B2
(45) Date of Patent: Oct. 3, 2023

(54) MULTI-GANG ADJUSTABLE MUD RING ASSEMBLIES

(71) Applicant: Hubbell Incorporated, Shelton, CT (US)

(72) Inventors: Victor Beristany, South Bend, IN (US); Krzysztof Wojciech Korcz, Granger, IN (US)

(73) Assignee: HUBBELL INCORPORATED, Shelton, CT (US)

( * ) Notice: Subject to any disclaimer, the term of this patent is extended or adjusted under 35 U.S.C. 154(b) by 147 days.

(21) Appl. No.: 17/367,886

(22) Filed: Jul. 6, 2021

(65) Prior Publication Data

US 2022/0006277 A1 Jan. 6, 2022

Related U.S. Application Data

(60) Provisional application No. 63/048,508, filed on Jul. 6, 2020.

(51) Int. Cl.
*H02G 3/12* (2006.01)
*H02G 3/08* (2006.01)

(52) U.S. Cl.
CPC ............. *H02G 3/125* (2013.01); *H02G 3/081* (2013.01)

(58) Field of Classification Search
CPC ............................... H02G 3/125; H02G 3/081
USPC ......................................................... 174/58
See application file for complete search history.

(56) References Cited

U.S. PATENT DOCUMENTS

| 5,224,673 | A | 7/1993 | Webb | |
|---|---|---|---|---|
| 5,931,325 | A * | 8/1999 | Filipov | H02G 3/081 220/3.7 |
| 6,209,836 | B1 | 4/2001 | Swanson | |
| 6,666,419 | B1 | 12/2003 | Vrame | |
| 6,820,760 | B2 * | 11/2004 | Wegner | H02G 3/121 220/4.03 |
| 7,025,314 | B1 | 4/2006 | Thomas | |
| 7,038,131 | B1 | 5/2006 | Gretz | |
| 7,259,328 | B1 | 8/2007 | Gretz | |
| 7,301,099 | B1 | 11/2007 | Korez | |
| 7,355,118 | B1 | 4/2008 | Gretz | |
| 7,468,486 | B2 | 12/2008 | Yan | |
| 7,531,743 | B2 * | 5/2009 | Johnson | H02G 3/081 174/53 |

(Continued)

*Primary Examiner* — Timothy J Thompson
*Assistant Examiner* — Michael F McAllister
(74) *Attorney, Agent, or Firm* — Wissing Miller LLP

(57) ABSTRACT

A mud ring assembly includes base member, raised member, telescoping member and plurality of drive members. The base member has a flange and an opening through the flange. The raised member extends from the base member and follows the opening in the flange to form a raised wall. The raised member has a plurality of mounting tabs extending from the raised wall toward the opening in the raised member. The telescoping member is positioned within the raised member opening and is movable relative to the raised member between a retracted position and an extended position. The telescoping member has a wall, an opening and a plurality of mounting tabs extending from the wall toward the opening in the telescoping member. Rotation of the drive members causes the telescoping member to move between the retracted position and the extended position.

24 Claims, 30 Drawing Sheets

(56) References Cited

U.S. PATENT DOCUMENTS

| | | | |
|---|---|---|---|
| 7,645,936 B2* | 1/2010 | Magno, Jr. | H02G 3/14 |
| | | | 174/53 |
| 7,824,213 B1 | 11/2010 | Korcz | |
| 8,076,577 B2 | 12/2011 | Magno, Jr. | |
| 8,575,484 B1 | 11/2013 | Witherbee | |
| 8,680,394 B2 | 3/2014 | Korcz et al. | |
| 9,252,579 B2* | 2/2016 | Korcz | H02G 3/08 |
| 9,553,438 B2* | 1/2017 | Korcz | H02G 3/14 |
| 10,263,403 B2* | 4/2019 | Korcz | H02G 3/126 |
| 11,557,888 B2* | 1/2023 | Phillips | H01R 13/746 |
| 2002/0157845 A1 | 10/2002 | Vrame | |
| 2003/0189043 A1* | 10/2003 | Wegner | H02G 3/121 |
| | | | 220/4.03 |
| 2004/0155036 A1* | 8/2004 | Wegner | H02G 3/121 |
| | | | 220/3.2 |
| 2008/0156513 A1* | 7/2008 | Johnson | H02G 3/081 |
| | | | 174/57 |
| 2008/0223600 A1* | 9/2008 | Magno | H02G 3/14 |
| | | | 174/66 |
| 2010/0108347 A1 | 5/2010 | Korez | |
| 2010/0218969 A1 | 9/2010 | Purves | |
| 2010/0252552 A1 | 10/2010 | Nikayin | |
| 2010/0270446 A1 | 10/2010 | Phillips | |
| 2014/0202758 A1 | 7/2014 | Lolachi | |
| 2014/0238738 A1 | 8/2014 | Korcz | |
| 2014/0262417 A1* | 9/2014 | Korcz | H02G 3/18 |
| | | | 174/66 |
| 2015/0001357 A1 | 1/2015 | Jaffari | |
| 2018/0241187 A1* | 8/2018 | Korcz | H02G 3/081 |

* cited by examiner

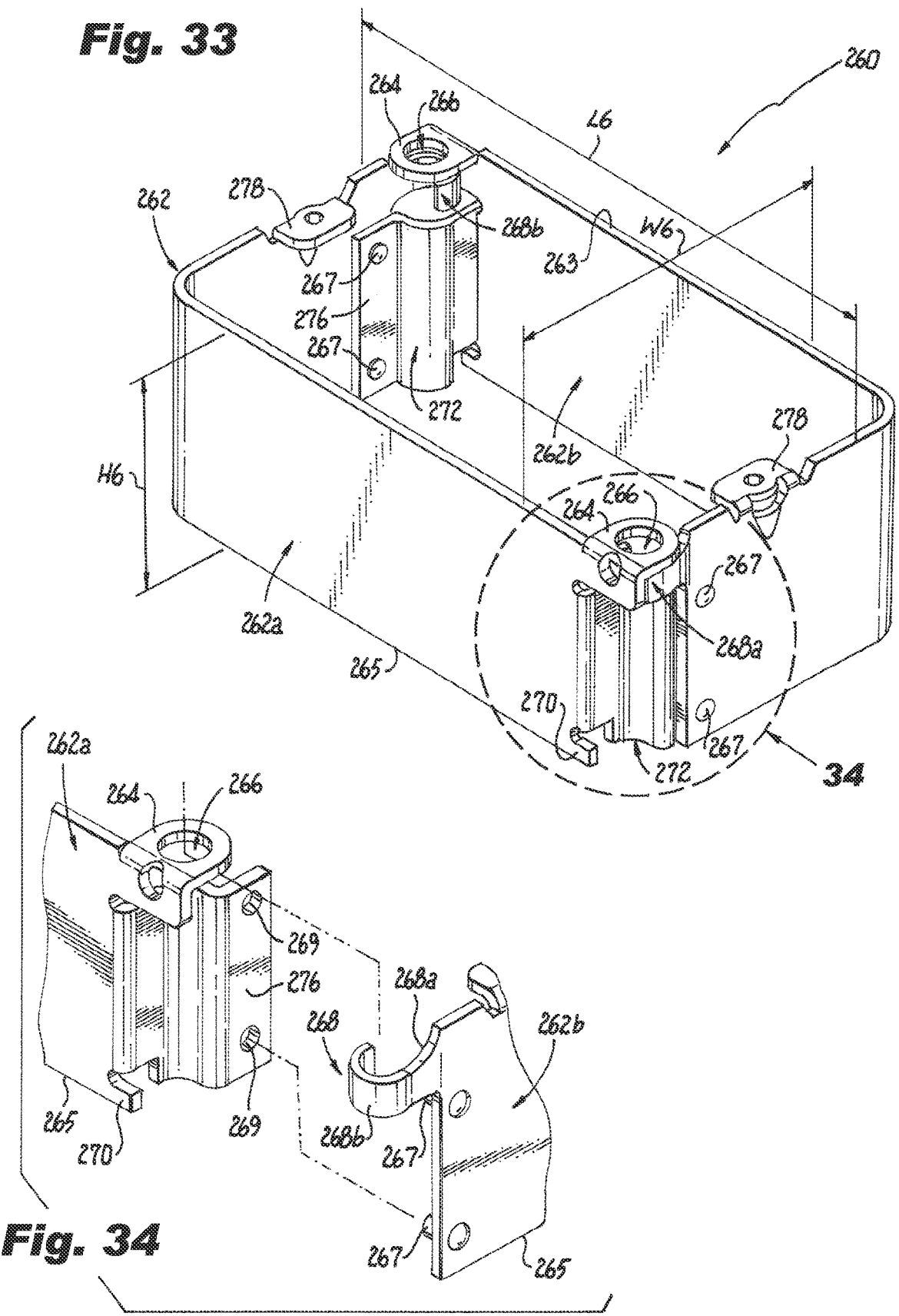

MULTI-GANG ADJUSTABLE MUD RING ASSEMBLIES

CROSS REFERENCE TO RELATED APPLICATIONS

The present disclosure is based on and claims benefit from co-pending U.S. Provisional Patent Application Ser. No. 63/048,508 filed on Jul. 6, 2020, entitled "Multi-Gang Adjustable Mud Ring Assemblies" the contents of which are incorporated herein in their entirety by reference.

BACKGROUND

Field

The present disclosure relates generally to mud rings, and more particularly to adjustable multi-gang mud ring assemblies.

Description of the Related Art

Electrical devices (e.g., electrical outlets, switches, and others) are typically installed in a wall or ceiling. A multi-gang or single gang junction box is typically secured to a stud or support beam inside the wall or ceiling. In multi-gang boxes, typically more than one electrical device is installed in the box. The electrical devices are then secured in the box in electrical communication with electrical conductors so that the electrical devices extend or protrude from the wall or ceiling. In this manner, any exposed portion of the electrical conductor and their connections to the electrical devices are shielded within the box. Plaster rings, extension rings, and extenders, commonly known as mud rings, are typically attached to the box prior to the installation of sheet rock, wall board, or other covering surface material.

SUMMARY

The present disclosure provides exemplary embodiments of multi-gang mud ring assemblies. In an exemplary embodiment, a multi-gang mud ring assembly includes a base member, a raised member, a telescoping member and a plurality of drive members. The base member has a flange and a rectangular or square opening through the flange. The raised member extends from the base member and follows the rectangular or square opening in the flange to form a rectangular or square raised wall. The raised member has a plurality of mounting tabs extending from the raised wall into the rectangular or square opening. The plurality of mounting tabs are substantially perpendicular to the raised wall. The telescoping member is positioned within the raised member and is movable within and relative to the raised member between a retracted position and an extended position. The telescoping member has a rectangular or square wall and a plurality of mounting tabs extending from the rectangular or square wall into the rectangular or square opening, such that the plurality of mounting tabs are substantially perpendicular to the rectangular or square wall. In this configuration, one of the plurality of mounting tabs on the telescoping member is aligned with one of the mounting tabs on the raised member to define a mounting tab pair. The rectangular or square wall of the telescoping member includes a plurality of protective members. In this configuration, one protective member is positioned in proximity to one of the mounting tab pairs. In this configuration, one of the plurality of drive members is operatively coupled to one or both mounting tabs of one of the mounting tab pairs such that rotation of the drive members cause the telescoping member to move between the retracted position and the extended position.

In an exemplary embodiment, a multi-gang mud ring assembly includes a base member, a raised member, a telescoping member and a plurality of drive members. The base member has a flange and a substantially rectangular or square opening through the flange. The raised member extends from the base member and follows the opening in the flange to form a substantially rectangular or square raised wall. The raised member has a plurality of mounting tabs extending from the raised wall toward the opening. The telescoping member is positioned within the raised member and movable within the raised member between a retracted position and an extended position. The telescoping member has a substantially rectangular or square wall and a plurality of mounting tabs extending from the wall toward a center of the opening such that one of the plurality of mounting tabs of the telescoping member is aligned with one of the mounting tabs on the raised member to define a mounting tab pair. One of the plurality of drive members is operatively coupled to the mounting tabs of one of the mounting tab pairs such that rotation of the drive member causes the telescoping member to move between the retracted position and the extended position.

In an exemplary embodiment, a rectangular or square mud ring kit includes an electrical box and a mud ring assembly. The mud ring assembly includes a base member, a raised member, a telescoping member and a plurality of drive members as described herein.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 33 is a perspective view of the telescoping member of FIG. 29, illustrating the walls of the telescoping member aligned for interconnection;

FIG. 34 is an enlarged perspective view of a portion of the telescoping member of FIG. 33 taken from detail 34, illustrating an interconnection of walls of the telescoping member;

DETAILED DESCRIPTION

Figure 1:
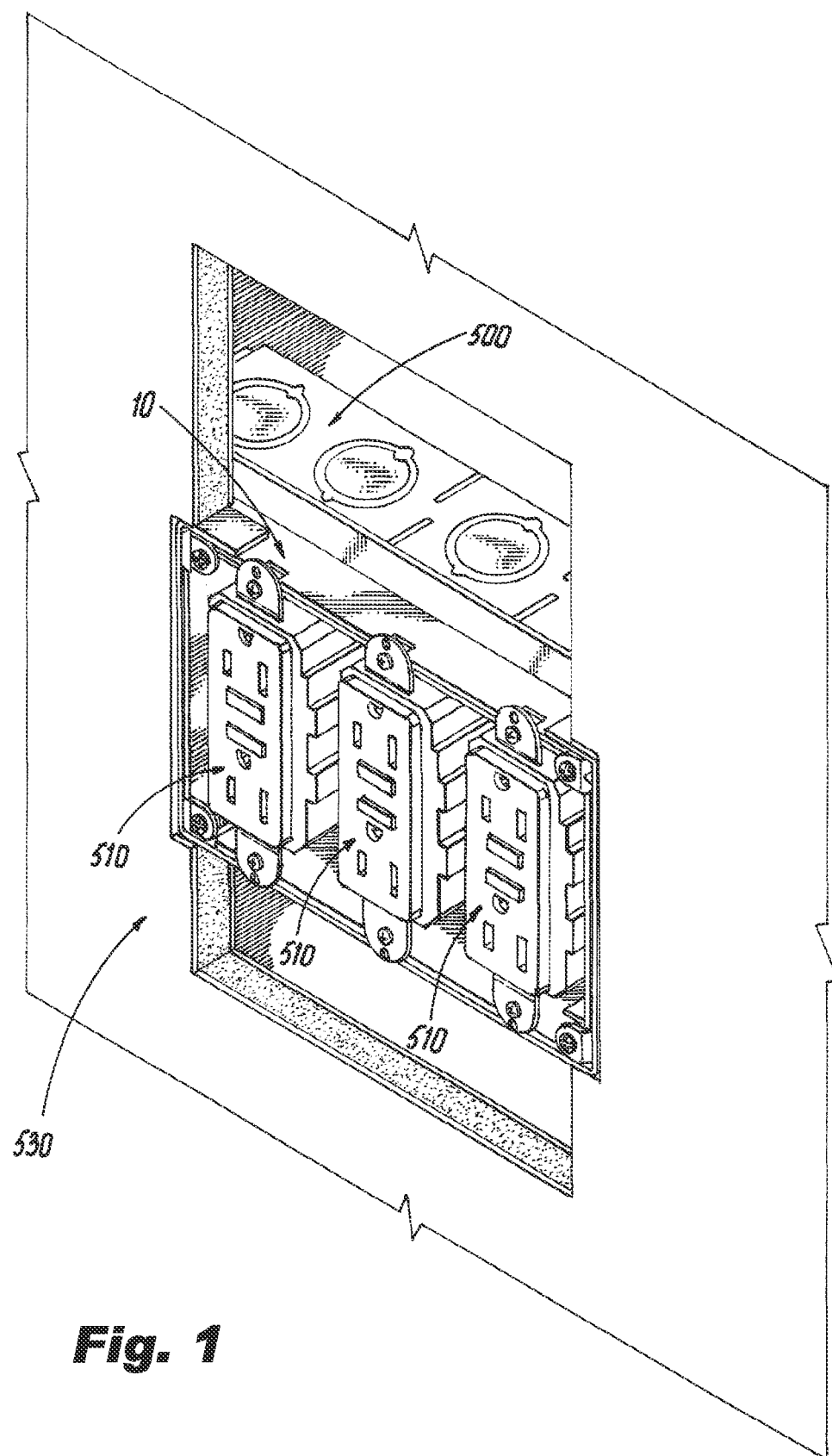
FIG. 1 is a perspective view of an exemplary embodiment of a three-gang electrical box mounted to a wall stud and an adjustable three-gang mud ring secured to the electrical box and extending through a wall covering with a telescoping member of the mud ring adjusted to a retracted position.
Figure 2:
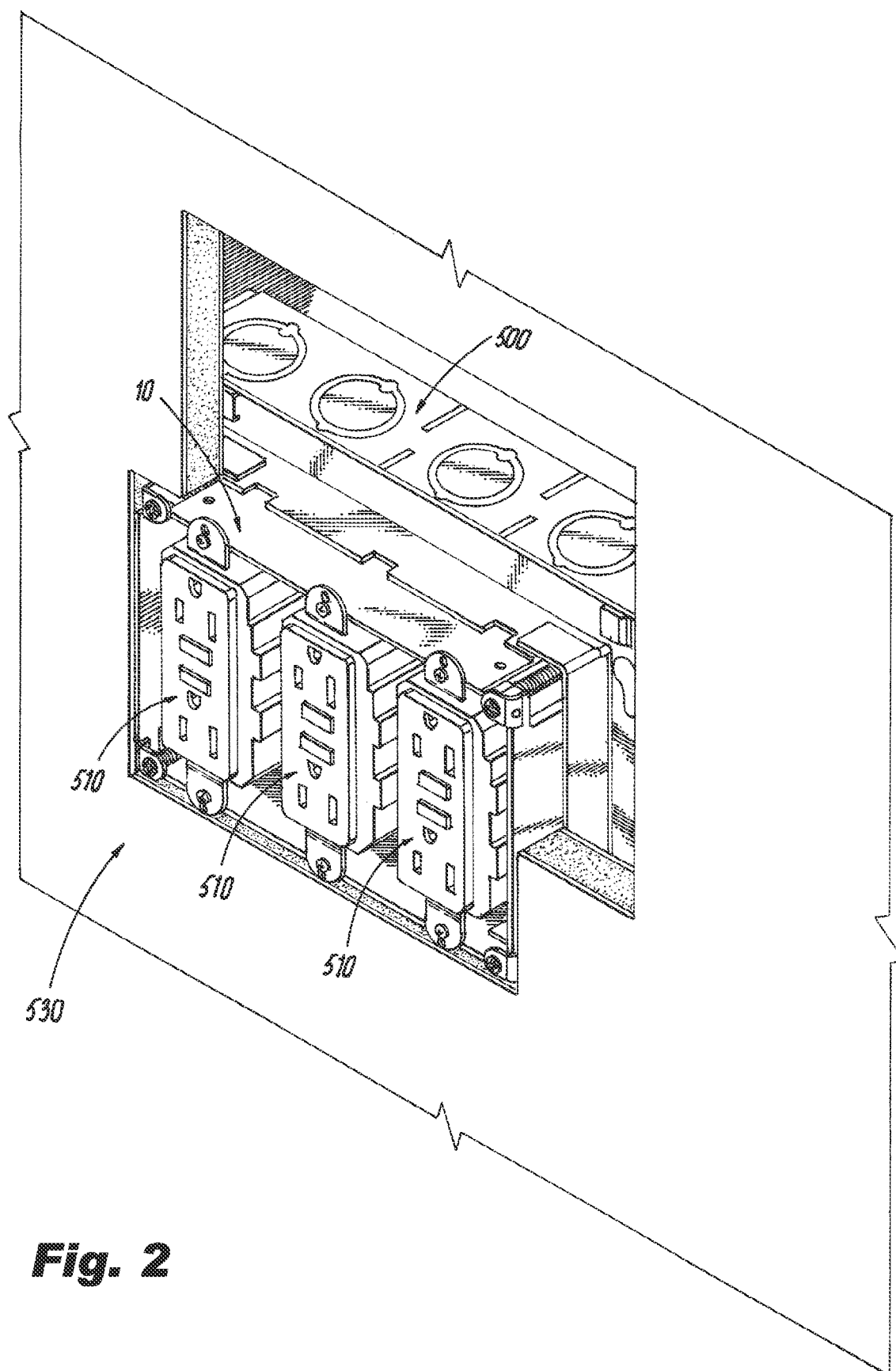
FIG. 2 is a perspective view of the three-gang electrical box mounted to a wall stud similar to FIG. 1 and the adjustable three-gang mud ring secured to the electrical box and extending through a wall covering with the telescoping member of the mud ring adjusted to an extended position.
Figure 14:
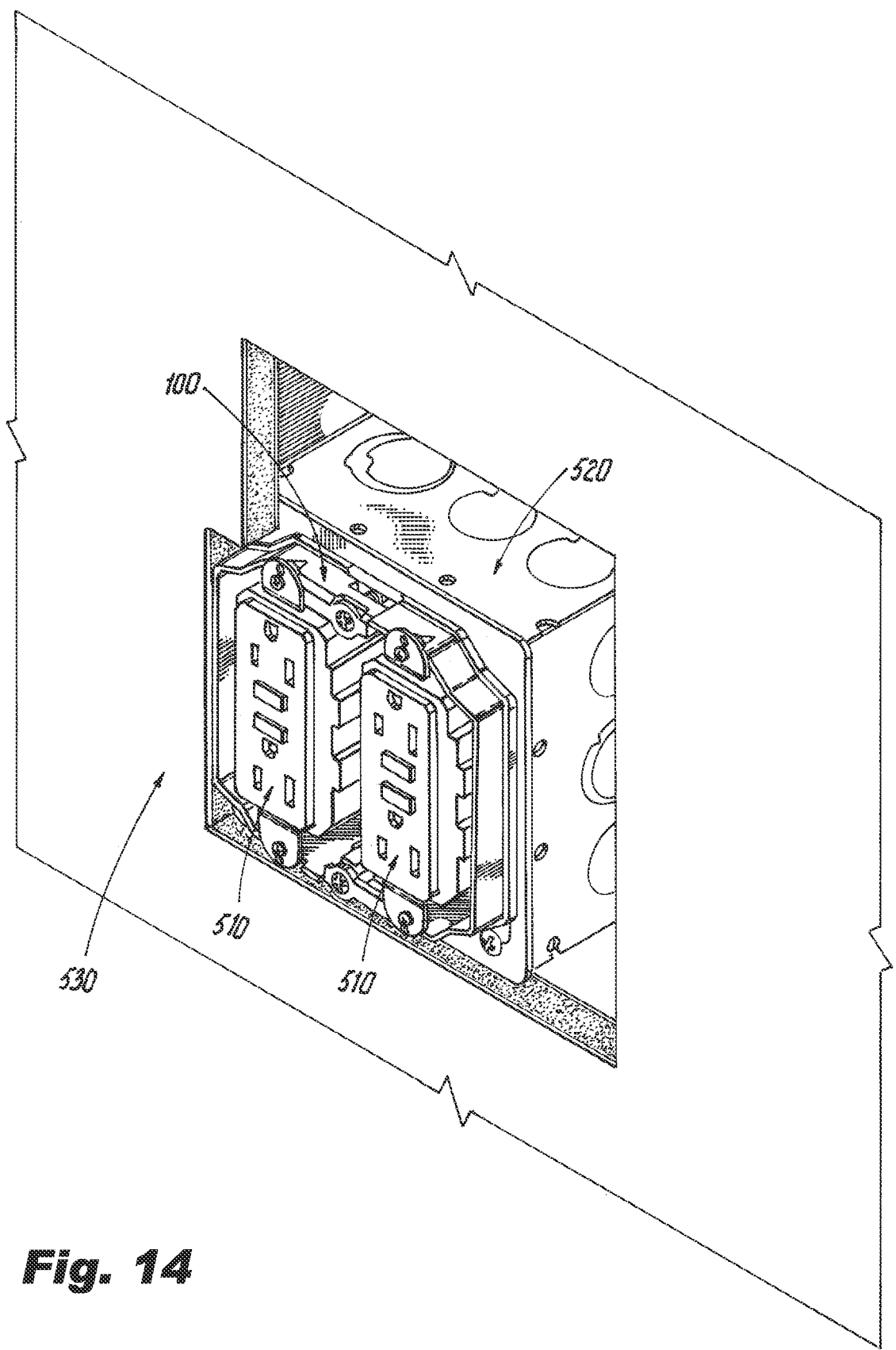
FIG. 14 is a perspective view of an exemplary embodiment of a two-gang electrical box mounted to a wall stud and an adjustable two-gang mud ring secured to the electrical box and extending through a wall covering with a telescoping member of the mud ring adjusted to a retracted position.
Figure 15:
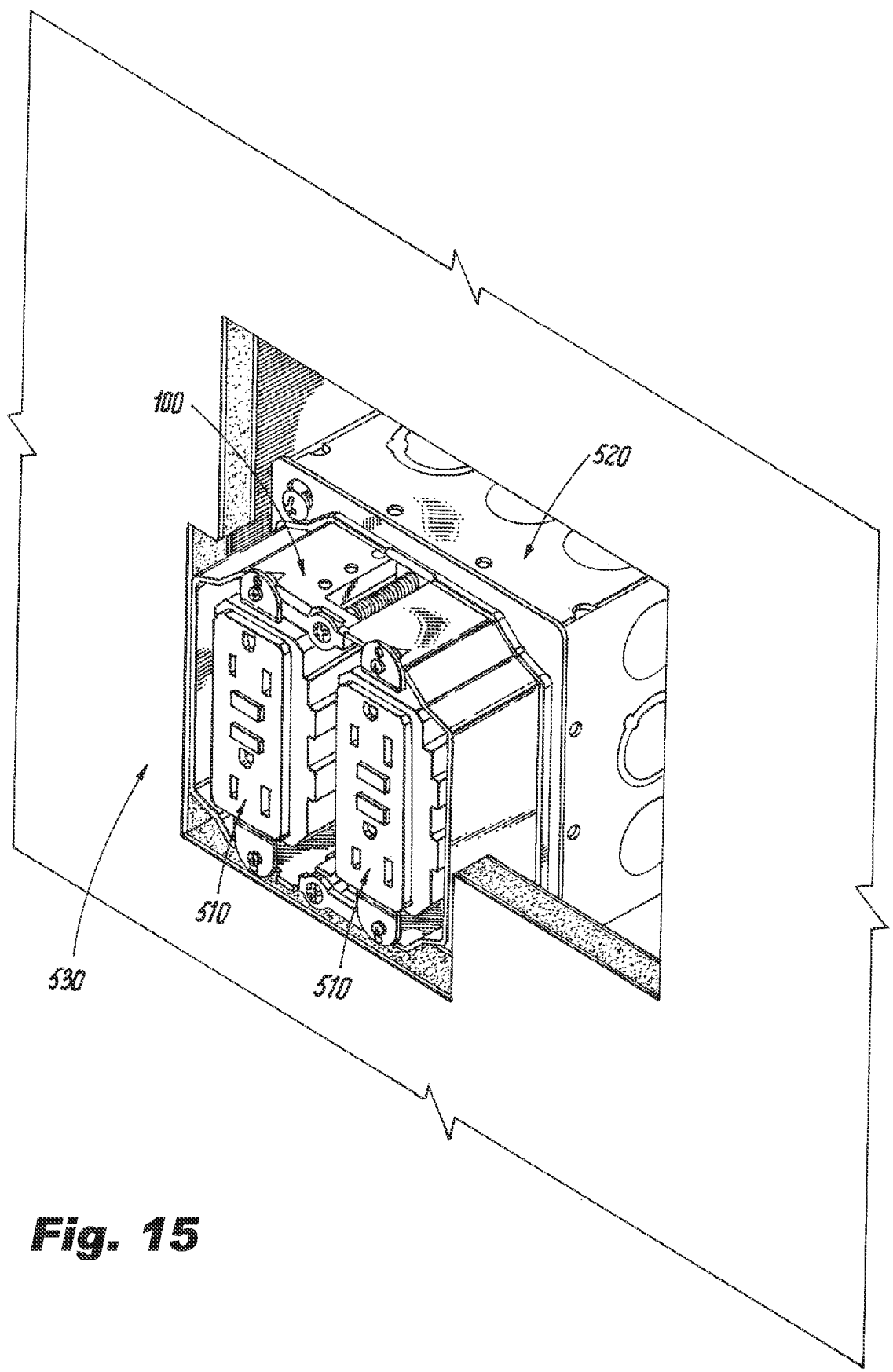
FIG. 15 is a perspective view of the two-gang electrical box mounted to a wall stud similar to FIG. 14 and an adjustable two-gang mud ring secured to the electrical box and extending through a wall covering with the telescoping member of the mud ring adjusted to an extended position.
Figure 27:
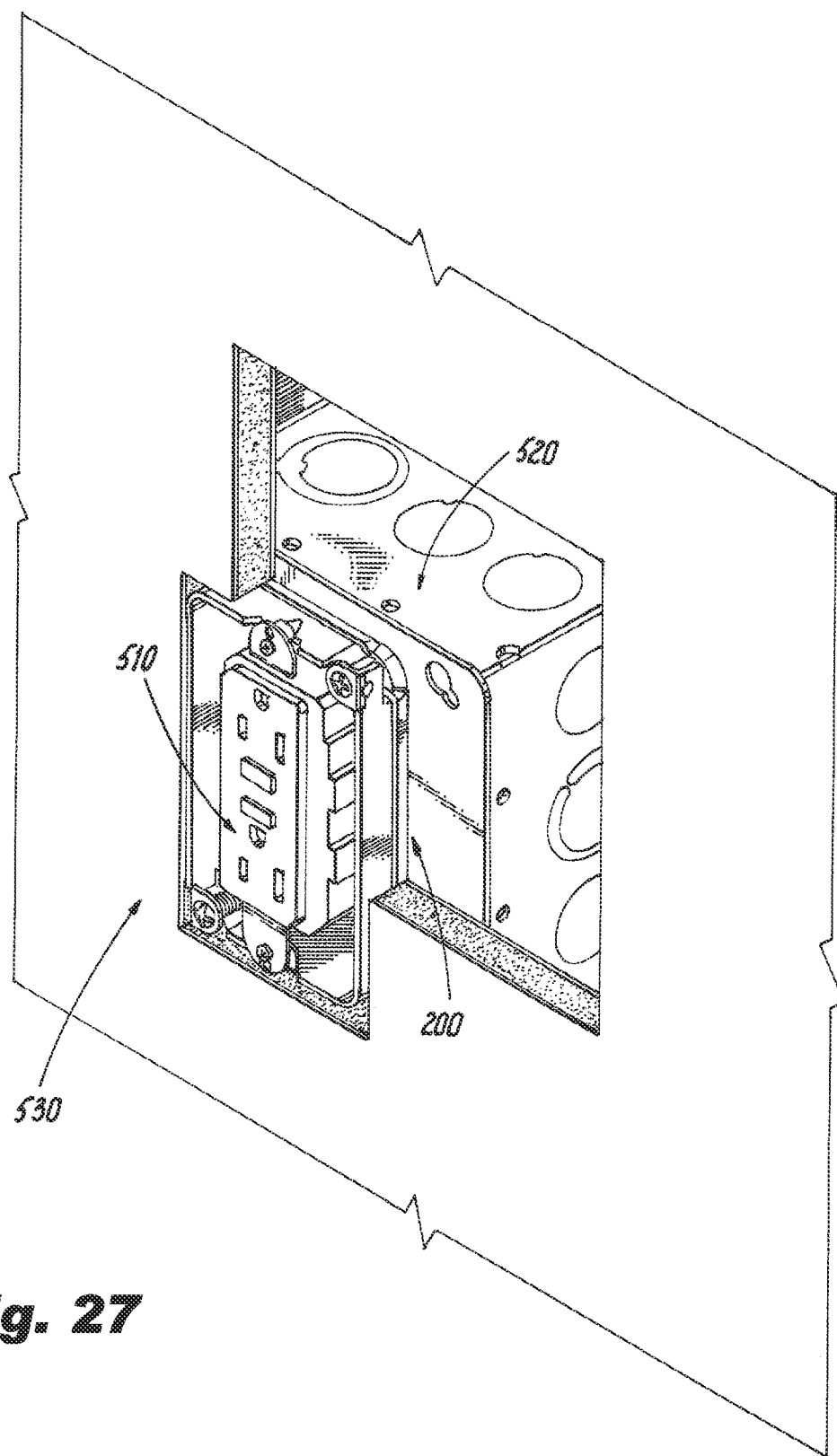
FIG. 27 is a perspective view of an exemplary embodiment of a single-gang electrical box mounted to a wall stud and an adjustable single-gang mud ring secured to the electrical box and extending through a wall covering with a telescoping member of the mud ring adjusted to a retracted position.
Figure 28:
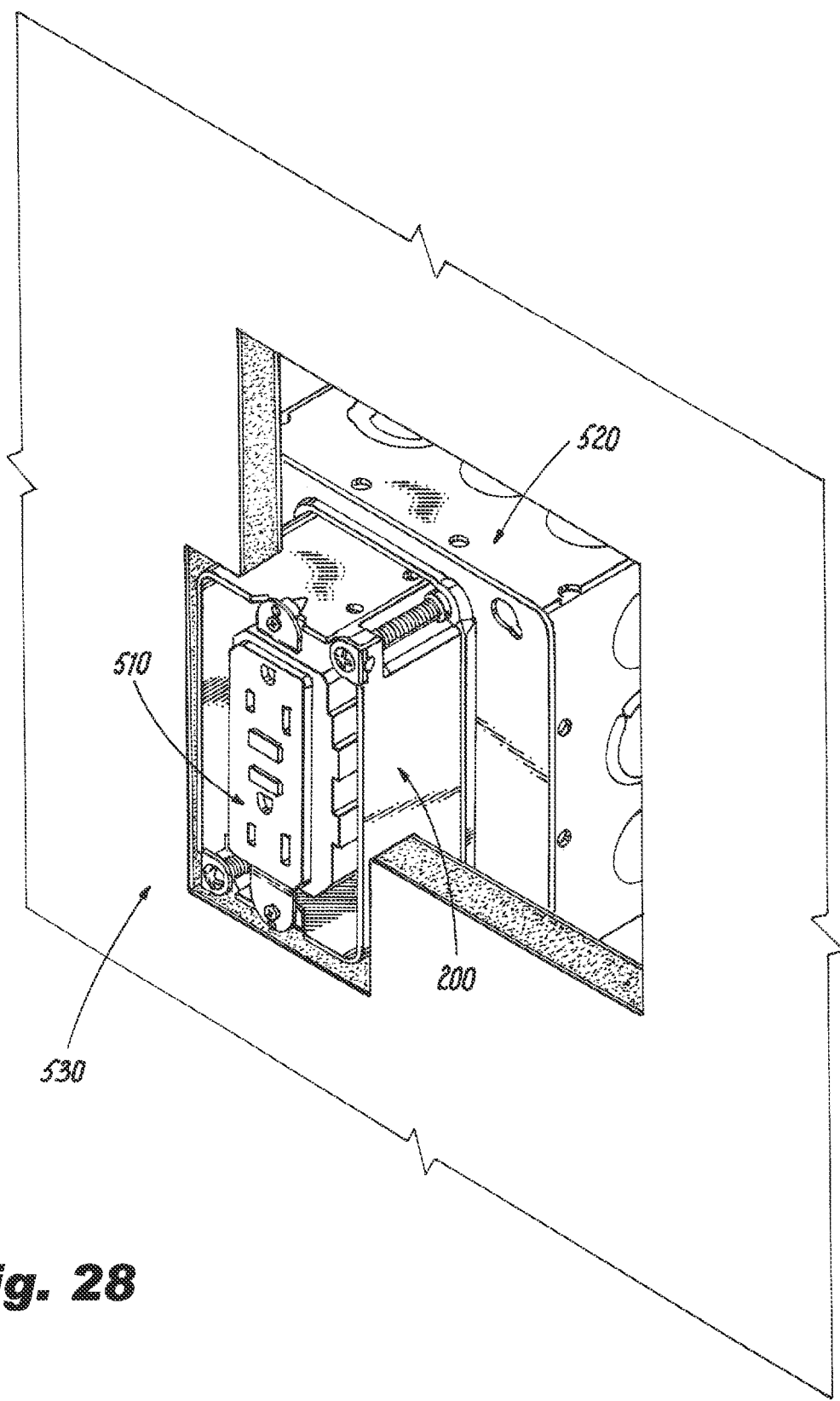
FIG. 28 is a perspective view of the single-gang electrical box mounted to a wall stud similar to FIG. 27 and an adjustable single-gang mud ring secured to the electrical box and extending through a wall covering with the telescoping member of the mud ring adjusted to an extended position.

The present disclosure provides exemplary embodiments of adjustable mud ring assemblies for electrical boxes and kits that include an adjustable mud ring assembly according to the present disclosure and an electrical box to which the adjustable mud ring assembly can be secured. As shown in FIGS. 1 and 2, one exemplary embodiment of the present disclosure depicts a three-gang electrical box 500 with a three-gang adjustable mud ring assembly 10 secured to the electrical box 500, where the three-gang adjustable mud ring assembly 10 can be used when securing three electrical devices 510 to the electrical box. As shown in FIGS. 14 and 15, another exemplary embodiment of the present disclosure depicts a two-gang electrical box 520 with a two-gang adjustable mud ring assembly 100 secured to the electrical box 520, where the two-gang adjustable mud ring assembly 100 can be used when securing two electrical devices 510 to the electrical box. It is noted that while three-gang boxes and mud ring assemblies are shown in FIGS. 1 and 2, and two-gang boxes and mud ring assemblies are shown in FIGS. 14 and 15, the present disclosure also contemplate other multi-gang boxes and multi-gang mud ring assemblies. As shown in FIGS. 27 and 28, another exemplary embodiment of the present disclosure depicts a single-gang electrical box 520 with a single-gang adjustable mud ring assembly 200 secured to the electrical box 520, where the single-gang adjustable mud ring assembly 200 can be used to secure a single electrical device 510 to the electrical box. The adjustable mud ring assemblies 10, 100 and/or 200 are typically attached to an electrical box 500 or 520 prior to the installation of a surface covering material 530, such as drywall, sheetrock, wall board, cement backer board, fiber cement backer board, or other surface covering materials. The electrical box 500 and/or 520 and adjustable mud ring assemblies 10, 100 and/or 200 can be installed in different orientations to conform to a desired or required orientation of the electrical device 510 to be attached to the adjustable mud ring assembly.

The electrical devices 510 contemplated by the present disclosure include, for example, electrical switches and electrical receptacles. For ease of description, the electrical devices may also be referred to herein collectively as the "devices" in the plural, and the "device" in the singular. The electrical boxes 500 and 520 may be made of metal or plastic. Non-limiting examples of metal electrical boxes include steel, aluminum and aluminum alloy boxes. Non-limiting examples of plastic electrical boxes include PVC boxes and other molded plastic boxes. The electrical boxes are typically multi-gang or single-gang rectangular or square boxes, and for ease of description may be referred to herein as the "boxes" in the plural and the "box" in the singular. The adjustable mud ring assemblies 10, 100 and/or 200 according to the present disclosure may be made of metal or plastic. Non-limiting examples of metal adjustable mud ring assemblies include steel, aluminum and aluminum alloy adjustable mud ring assemblies. Non-limiting examples of plastic adjustable mud ring assemblies include PVC adjustable mud ring assemblies and other molded plastic adjustable mud ring assemblies. For ease of description, the adjustable mud ring assemblies may also be referred to herein as the "mud rings" in the plural and the "mud ring" in the singular.

Figure 3:
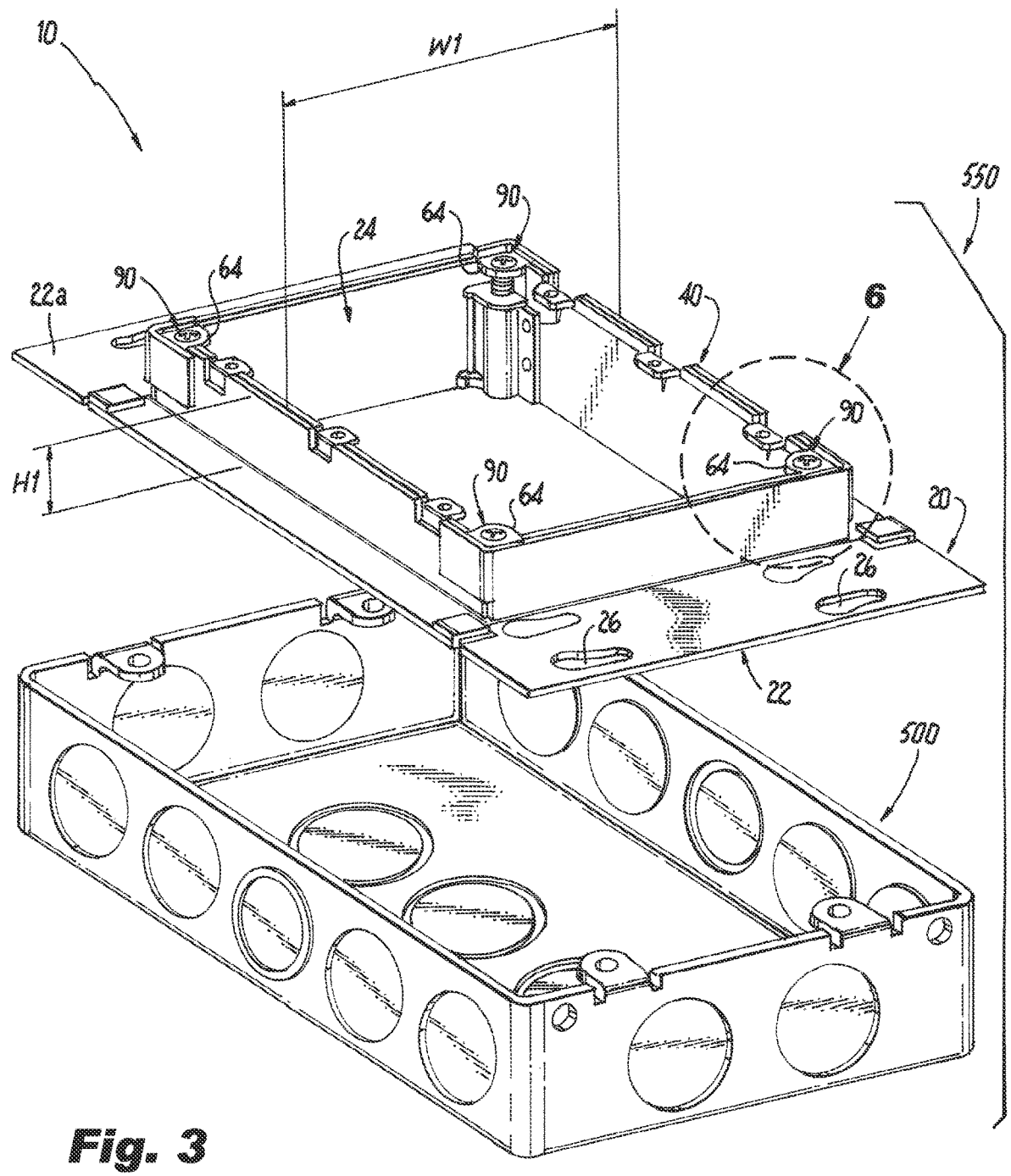
FIG. 3 is an exploded perspective view of the electrical box and adjustable mud ring of FIG. 1, illustrating the telescoping member of the mud ring in the retracted position.
Figure 8:
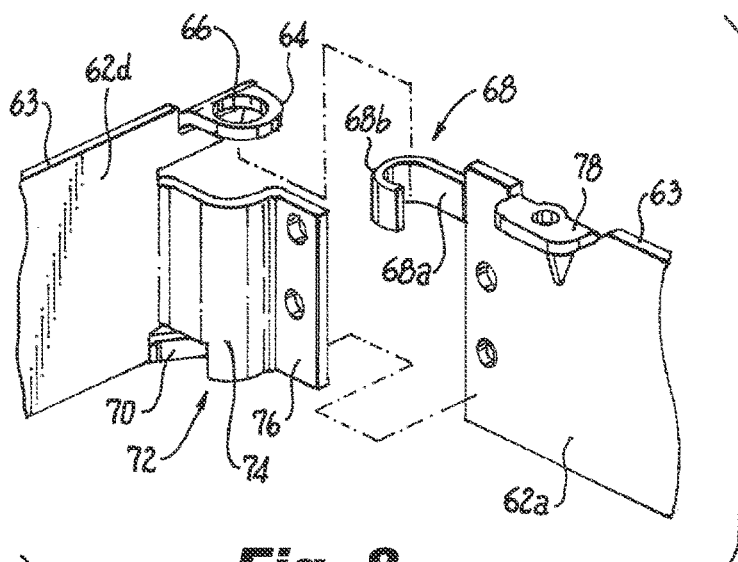
FIG. 8 is an enlarged perspective view of a portion of the telescoping member of FIG. 7 taken from detail 8, illustrating an interconnection of walls of the telescoping member.
Figure 9:
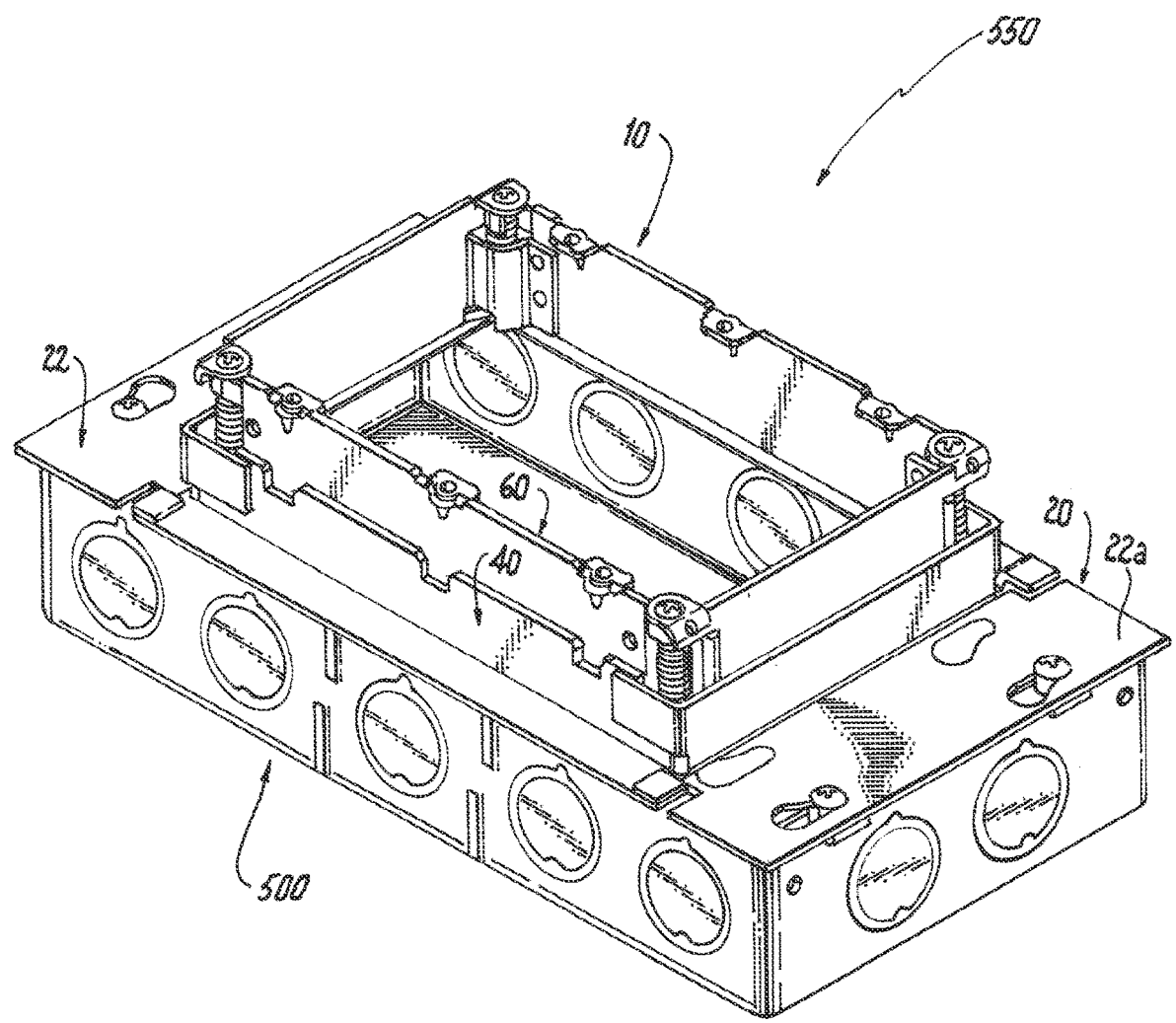
FIG. 9 is a perspective view of the electrical box and adjustable mud ring of FIG. 3, illustrating the telescoping member of the mud ring in the extended position.
Figure 10:
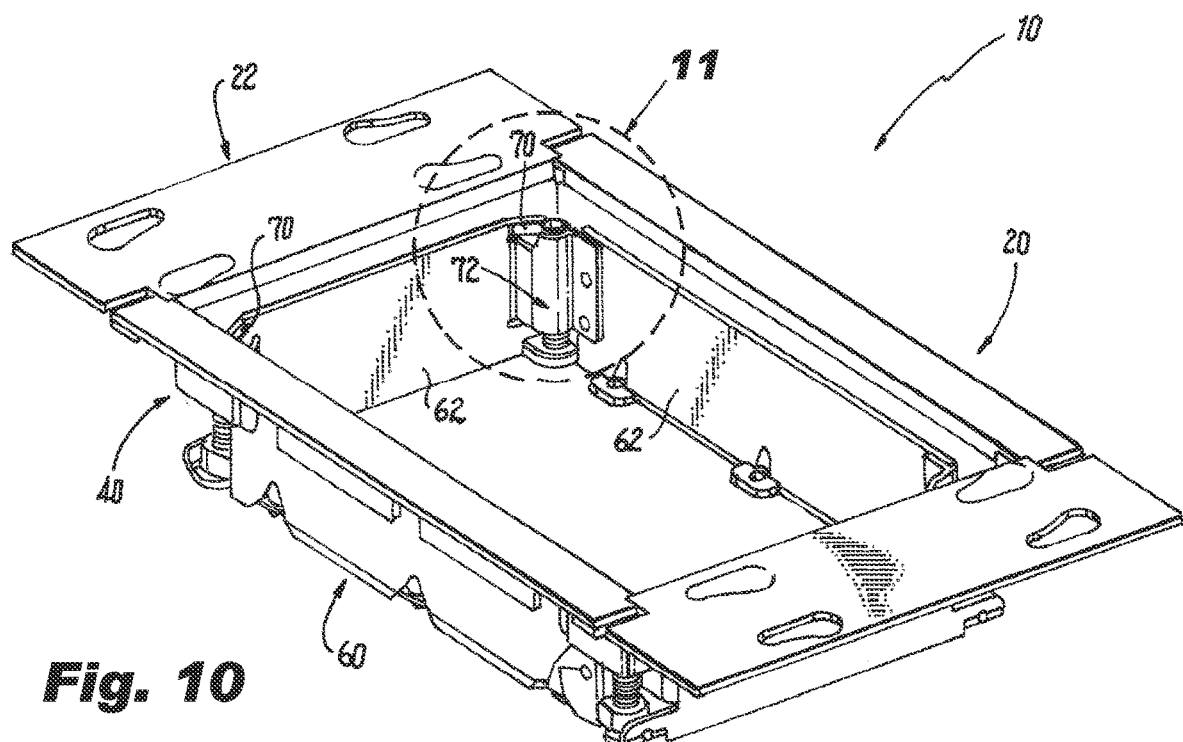
FIG. 10 is a bottom perspective view of the mud ring of FIG. 9.
Figure 11:
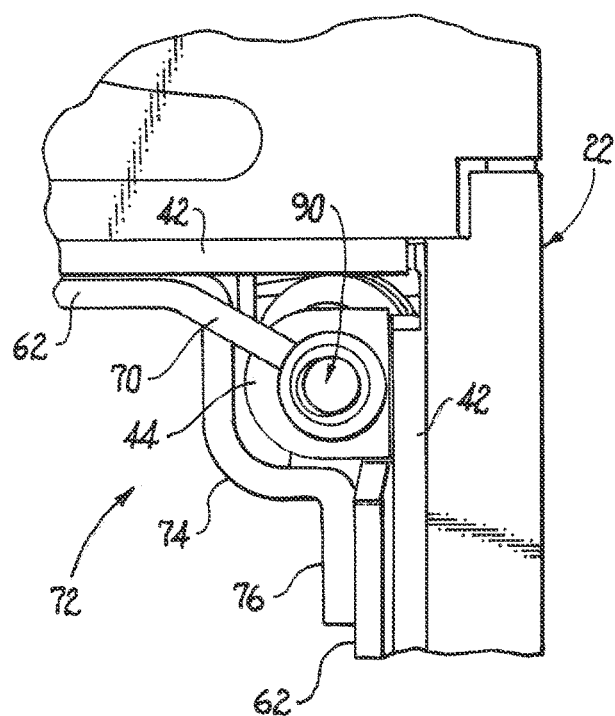
FIG. 11 is an enlarged plan view of a portion of the mud ring of FIG. 10 taken from detail 11.

Referring now to FIGS. 3 and 9, an exemplary embodiment of a mud ring kit 550 is shown. The mud ring kit 550 includes a mud ring assembly 10 and an electrical box 500. In this exemplary embodiment, the electrical box 500 is sufficiently sized so that a three-gang mud ring assembly 10 can be secured to the electrical box. Referring to FIGS. 4-8 and 10-13, the exemplary three-gang mud ring assembly 10 according to the present disclosure includes a base member 20, a raised member 40, a movable or telescoping member 60, and one or more drive members 90.

Figure 4:
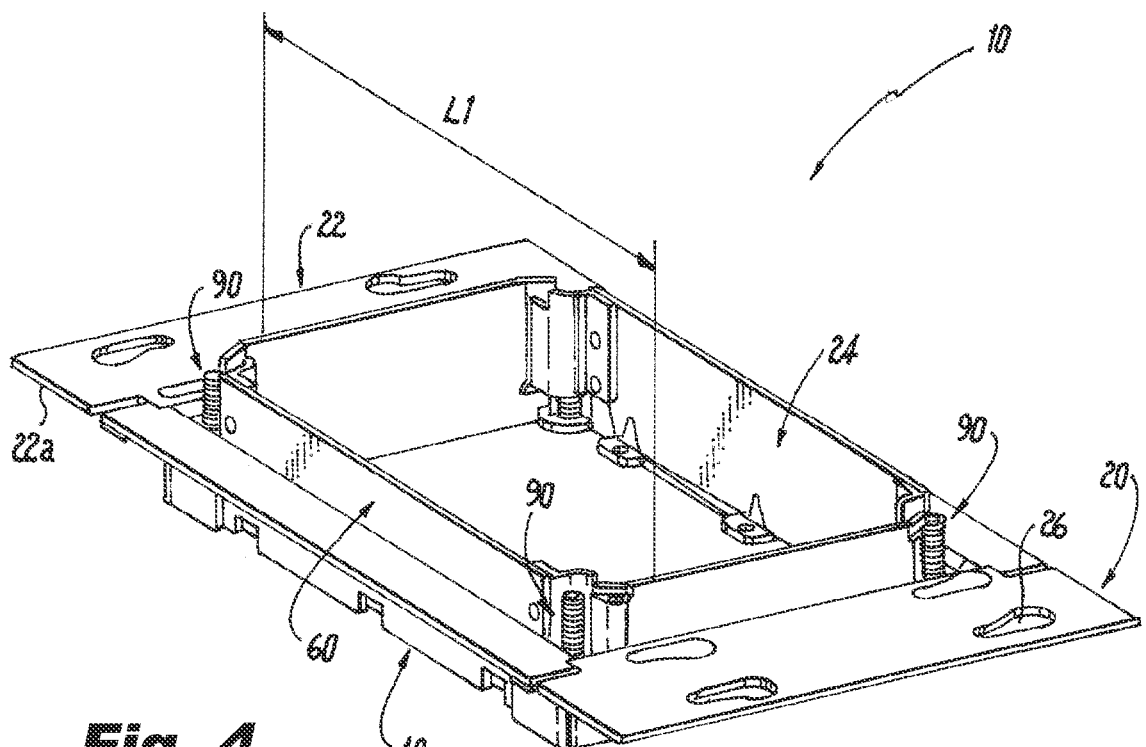
FIG. 4 is a bottom perspective view of the mud ring of FIG. 3.

Referring to FIGS. 4-8, the base member 20 includes a substantially planar flange 22 and an opening 24 in the flange, seen in FIG. 4. The flange 22 includes one or more mounting openings 26, e.g., keyhole slots, used for securing the base member 20 to a box 500. The raised member 40 of the mud ring assembly 10 extends from a top surface 22a of the flange 22 to provide a substantially rectangular or square wall 42 having a height "H1" and the inside opening 24 has a length "L1" and a width "W1." The height "H1" of the wall 42 is preferably set to coincide with a minimum thickness of a surface covering material 530, seen if FIGS. 1 and 2, through which at least a portion of the mud ring assembly 10 may extend. For example, if the thickness of the surface covering material 530 is to be ½ inch, the height of the wall 42 of the raised member 40 would be between about ⅜ of an inch and about ¾ of an inch. The inside opening 24 in the raised member 40 is preferably set to receive the telescoping member 60 and multiple devices 510, and may be less than an opening of the electrical box 500. For example, if the opening of a three-gang electrical box is in the range of about 9 inches by about 5 inches, the inside opening 24 would have a length "L1" in the range of about 5 inches to about 6 inches, and a width "W1" in the range of about 3 inches to about 4 inches. The raised member 40 extends around or along the opening 24 of the base member 20. The raised member 40 may be integral with or monolithically formed into the base member 20. In another embodiment, the raised member 40 may be secured to the base member 20 using, for example, welds or mechanical fasteners. The raised member 40 includes one or more mounting tabs 44, seen in FIG. 5, that extend from the wall 42 of the raised member 40 into the opening 24 such that the mounting tabs 44 are substantially perpendicular to the wall 42. Each mounting tab 44 includes an aperture 46 configured and dimensioned to operatively interact with one of the one or more drive members 90 such that activation of the drive members 90 can move the telescoping member 60 between a retracted position, seen in FIGS. 3 and 4, and a fully extended position, seen in FIGS. 9 and 12. In the exemplary embodiment shown, the apertures 46 are threaded holes and the drive members 90 are threaded fasteners.

Figure 7:
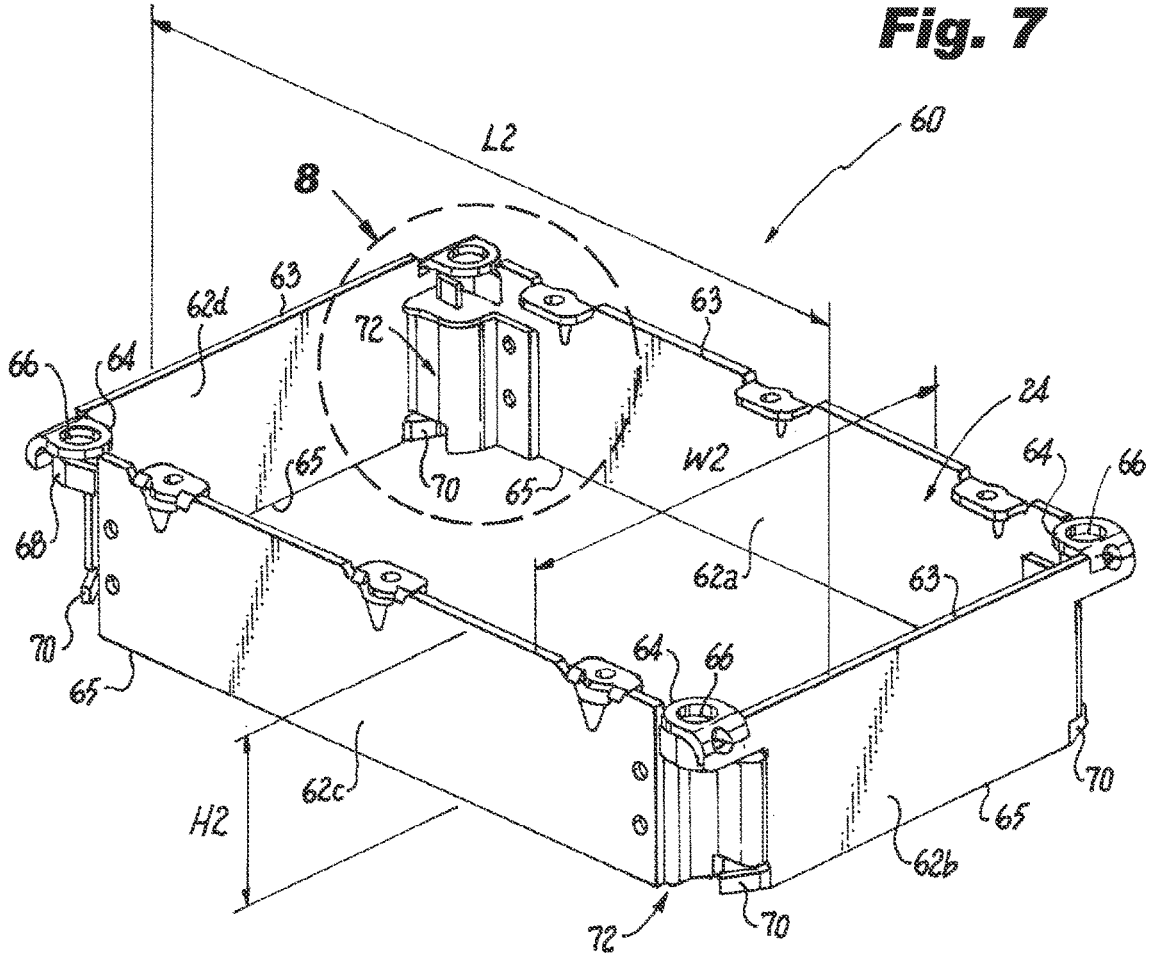
FIG. 7 is a perspective view of the telescoping member of FIG. 3, illustrating the walls of the telescoping member aligned for interconnection.

Referring to FIGS. 3, 7 and 8, the telescoping member 60 includes a wall 62, e.g., a rectangular or square wall, that may be formed from a plurality of interlocking wall segments, or the rectangular or square wall 62 may be formed as a unitary or monolithic wall. In the embodiment shown, the wall 62 is formed from a plurality of interlocking wall segments 62a, 62b, 62c and 62d. Each wall segment 62a, 62b, 62c and 62d has a height "H2," seen in FIG. 7, and when the wall segments are interlocked has an outer length "L2" and an outer width "W2," seen in FIG. 7. The height "H2" is preferably set to provide a desired maximum extension of the mud ring assembly 10. For example, if the desired maximum extension of the mud ring assembly 10 is to be about 2 inches, the height "H2" of the telescoping member 60 would be in the range of about ¾ of an inch and about 2 inches. The outer length "L2" of the telescoping member 60 is less than the length "L1" of the of the raised member 40, and the outer width "W2" of the telescoping member 60 is less than the width "W1" of the of the raised member 40 so that the telescoping member 60 fits within the opening 24 within the raised member 40 so that the telescoping member 60 is movable relative to the base member 20 and the raised member 40. The raised member 40 extends the depth of the opening 24 to the inside of the telescoping member 60. Preferably, the outer length "L2" and the outer width "W2" are set to fit within a multi-gang, here a three-gang, electrical box 500 used for mounting electrical devices 510 to the mud ring assembly 10. For example, if the length and width of a three-gang electrical box 500 is in a range of about 9 inches by about 5 inches, the outer length "L2" would be in a range of about 5 inches to about 6 inches and the outer width "W2" would be in a range of about 3 inches to about 4 inches.

Figure 6:
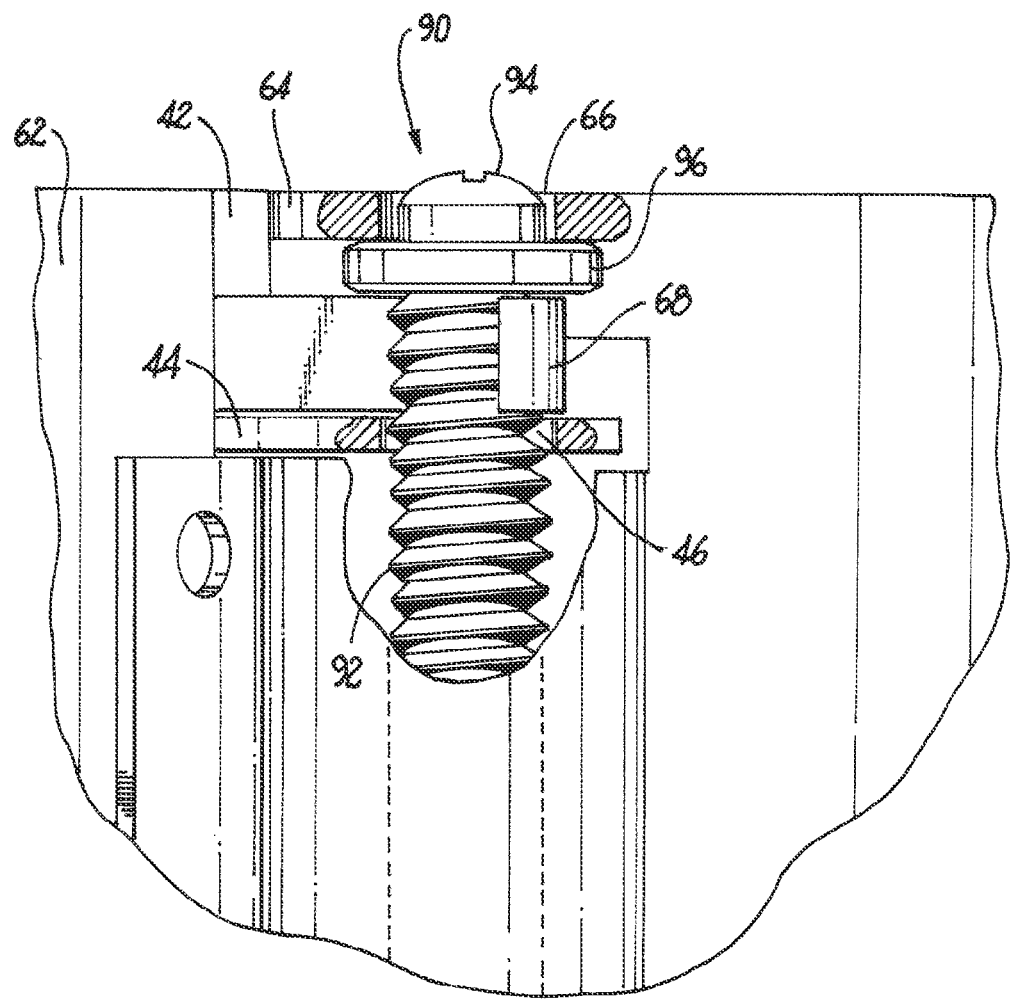
FIG. 6 is an enlarged side elevation view of a portion of the mud ring of FIG. 3 taken from detail 6, illustrating a fastener of the mud ring.

Referring again FIGS. 7 and 8, the telescoping member 60 includes one or more mounting tabs 64 that extend into the opening 24 such that the mounting tabs 64 are substantially perpendicular to the wall 62 of the telescoping member 60. In the exemplary embodiment shown, the wall segment 62b has two mounting tabs 64 extending into the opening 24, and the wall segment 62d has two mounting tabs 64 extending into the opening 24. However, it is noted that the mounting tabs 64 may be on any wall segment 62a-62d and at any location on the wall segments. The mounting tabs 64 are positioned on the wall segments 62b or 62d so that they align with a respective mounting tab 44 extending from the wall 42 of the raised member 40. Each mounting tab 64 includes an aperture 66, seen in FIGS. 7 and 8, configured and dimensioned to receive one of the one or more drive members 90, such that at least a portion of the drive member 90 can pass through mounting tab 64, as seen in FIGS. 6 and 9. The apertures 66 of the mounting tabs 64 are aligned with the apertures 46 of the respective mounting tabs 44.

Figure 5:
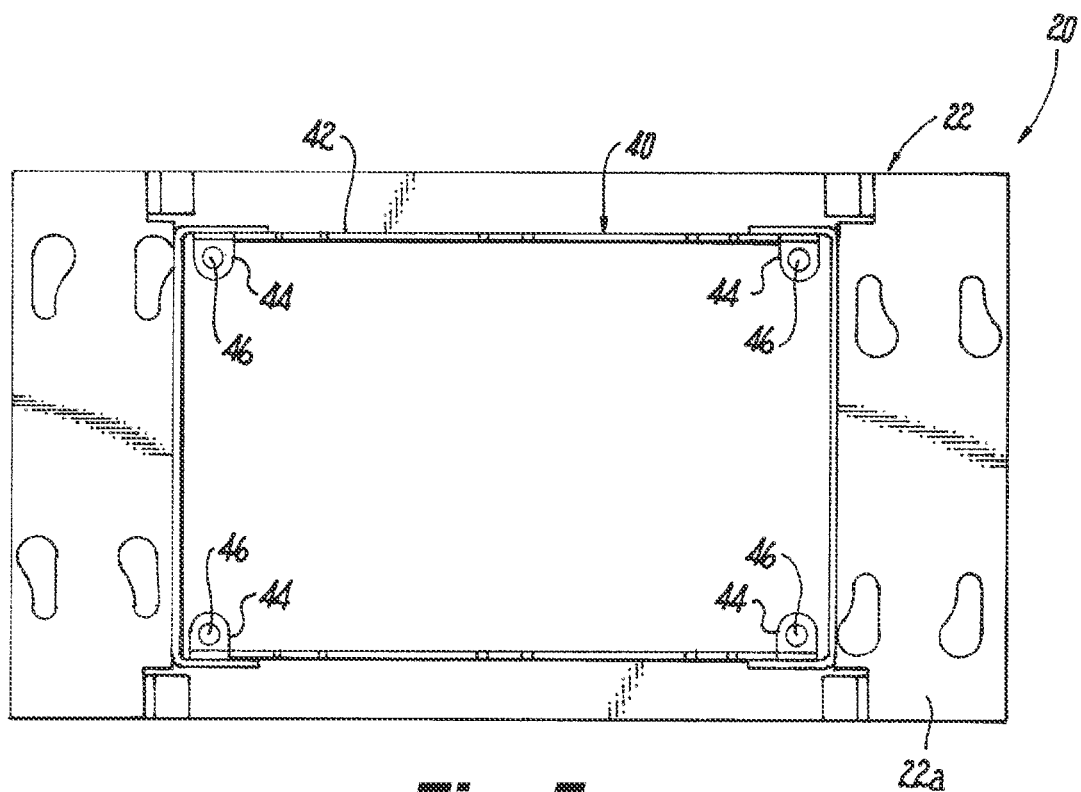
FIG. 5 is a top plan view of an exemplary embodiment of a base member of the adjustable mud ring of FIG. 3.

In the embodiment of FIGS. 1-13, there are four mounting tabs 44 on the raised member 40 and four mounting tabs 64 on the telescoping member 60. The mounting tabs 44 are positioned on opposite sides of the wall 42 of the raised member 40 in close proximity to the corners of the wall 42, as shown in FIG. 5. Similarly, mounting tabs 64 are positioned on opposite sides of the wall 62 of the telescoping member 60 in close proximity to the corners of the wall 62, as shown in FIG. 7. As shown in FIGS. 6 and 13, a first mounting tab 44 of the raised member 40 is aligned with a first mounting tab 64 of the telescoping member 60 to form a first mounting tab pair. In this configuration, the aperture 46 in the first mounting tab 44 is aligned with the aperture 66 in the first mounting tab 64 so that a first drive member 90 can pass into operative engagement with the aperture 46. A head 94 of the first drive member 90 passes at least partially into the aperture 66 in the first mounting tab 64. Similarly, a second mounting tab 44 of the raised member 40 is aligned with a second mounting tab 64 of the telescoping member 60 to form a second mounting tab pair. In this configuration, the aperture 46 in the second mounting tab 44 is aligned with the aperture 66 in the second mounting tab 64 so that a second drive member 90 can pass into operative engagement with the aperture 46 in the second mounting tab 44. A head 94 of the second drive member 90 passes at least partially into the aperture 66 in the second mounting tab 64. A third mounting tab 44 of the raised member 40 is aligned with a third mounting tab 64 of the telescoping member 60 to form a third mounting tab pair. In this configuration, the aperture 46 in the third mounting tab 44 is aligned with the aperture 66 in the third mounting tab 64 so that a third drive member 90 can pass into operative engagement with the aperture 46 in the third mounting tab 44. A head 94 of the third drive member 90 passes at least partially into the aperture 66 in the third mounting tab 64. Similarly, a fourth mounting tab 44 of the raised member 40 is aligned with a fourth mounting tab 64 of the telescoping member 60 to form a fourth mounting tab pair. In this configuration, the aperture 46 in the fourth mounting tab 44 is aligned with the aperture 66 in the fourth mounting tab 64 so that a fourth drive member 90 can pass into operative engagement with the aperture 46 in the fourth mounting tab 44. A head 94 of the fourth drive member 90 passes at least partially into the aperture 66 in the fourth mounting tab 64. Is it noted that the mounting tabs 44 on the raised member 40 act as a first stop that engage the mounting tabs 64 on the telescoping member 60. More specifically, as the telescoping member 60 is being moved to the retracted position by the drive members 90, the mounting tabs 64 move toward the mounting tabs 44 of the raised member 40. When the mounting tabs 64 contact the mounting tabs 44, the telescoping member 60 is in the retracted position and the mounting tabs 44 stop the telescoping member 60 from moving through the opening 24 and through the base 20.

Continuing to refer to FIGS. 6-8, the wall segments 62a and 62c include one or more interlocking members 68, which in the exemplary embodiment shown are hook shaped members with an arm 68a and a hook 68b. The arm 68a extends from the wall segment 62a or 62c so that the arm 68a is substantially perpendicular to a side edge of the wall segment. The hook 68b is attached to the arm 68a as shown in FIG. 7. The interlocking members 68 may be integrally or monolithic formed into the wall segment, e.g., wall segment 62a or 62c. In another embodiment, the interlocking members 68 may be separate members secured to the wall segments 62 using welds or mechanical fasteners. Similarly, the arm 68a and hook 68b may be integrally of monolithically formed members, or the arm 68a and hook 68b may be separate members joined together using, for example, welds.

Figure 12:
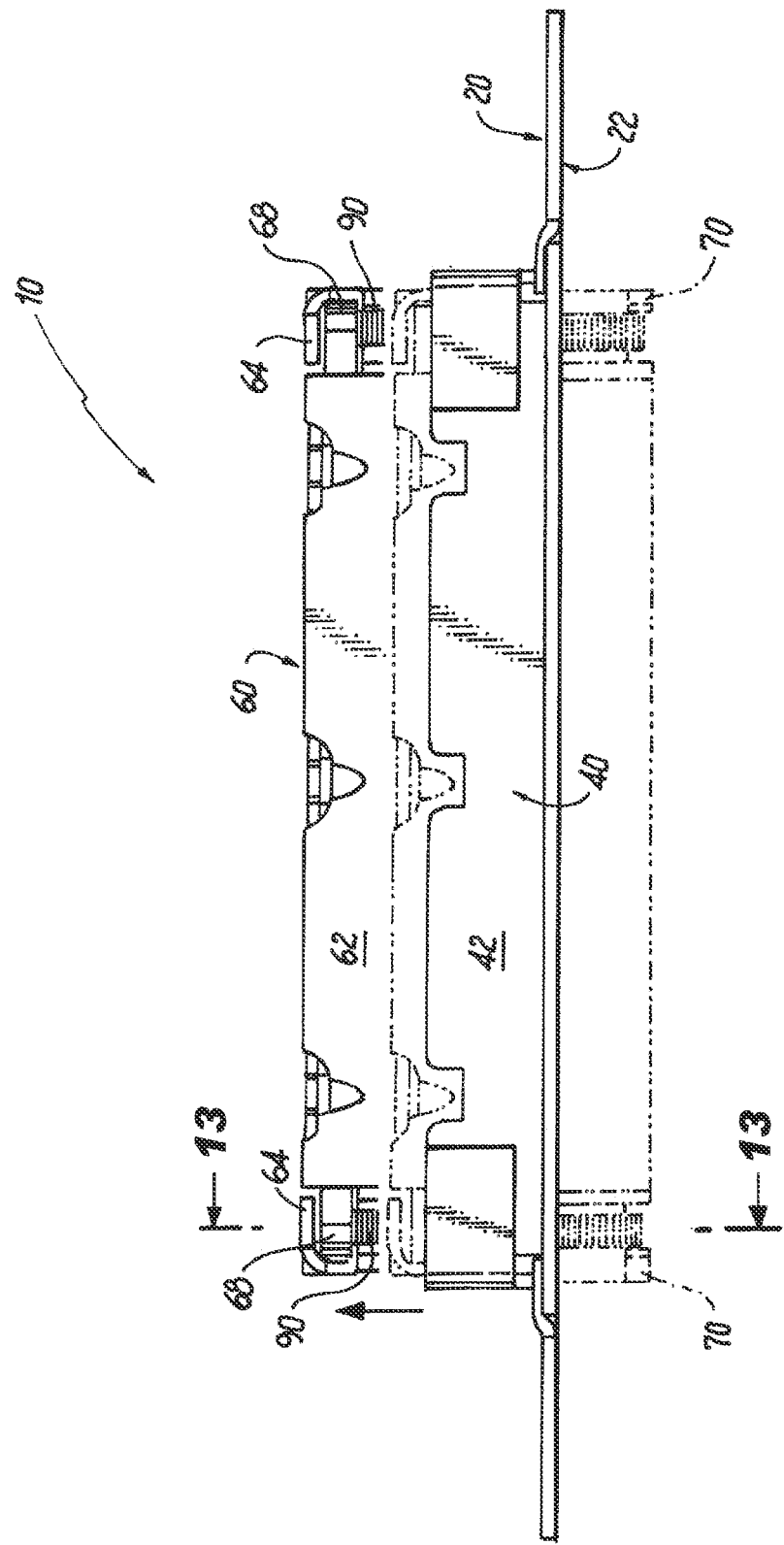
FIG. 12 is a side elevation view of the mud ring of FIG. 9, illustrating a phantom line telescoping member in a partially extended position and a solid line telescoping member in the fully extended position.
Figure 13:
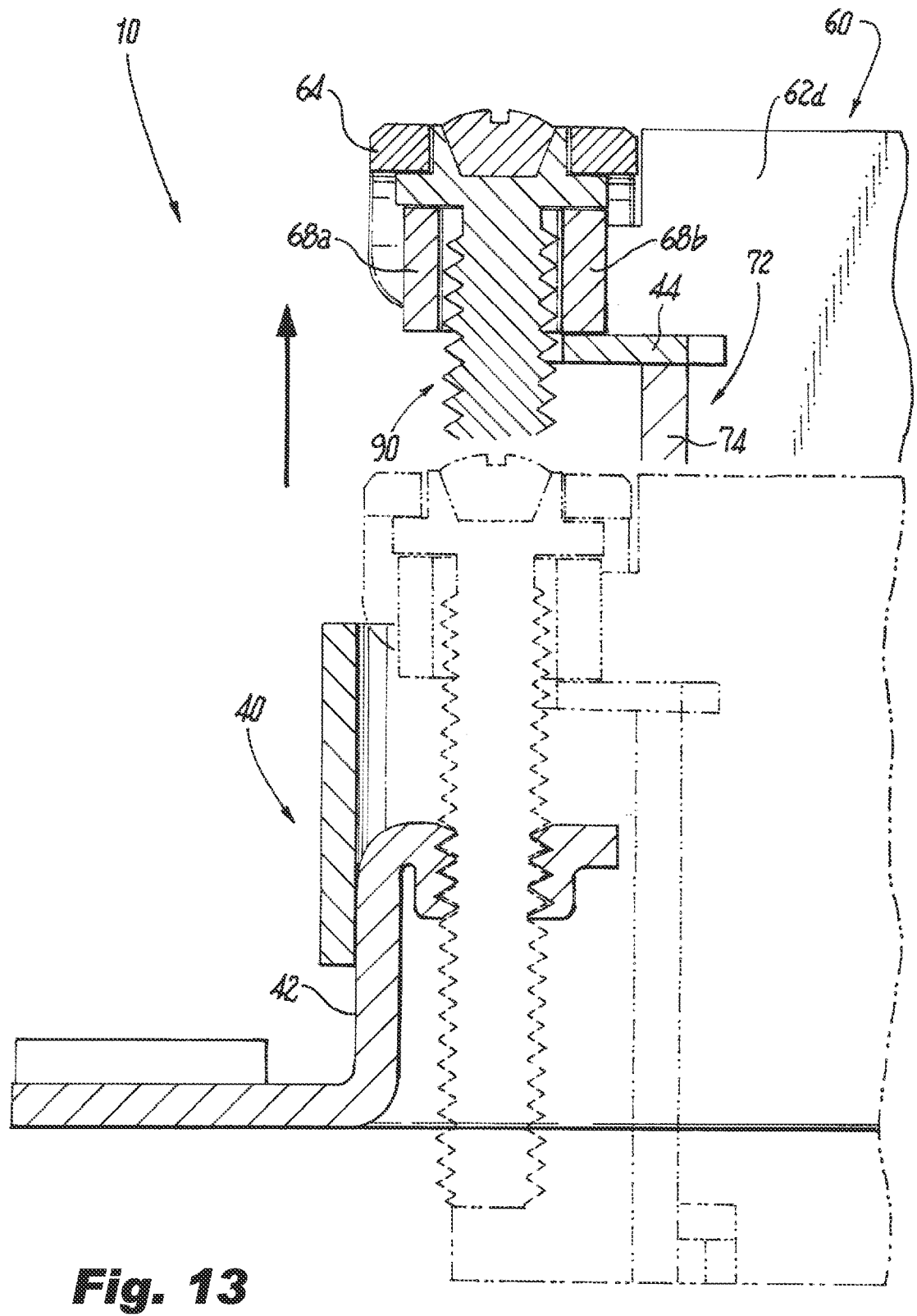
FIG. 13 is a cross-sectional view of the mud ring of FIG. 12 taken from line 13-13.

Referring again to FIGS. 7 and 8, the telescoping member 60 also includes one or more stop arms 70 provided to stop movement of the telescoping member 60 when the telescoping member reaches the fully extended position, seen in FIGS. 9 and 12. The stop arm 70 extends at or near a bottom edge 65 of the wall 62 so that the stop arm 70 is positioned to engage the mounting tab 44 of the raised member 40. In the exemplary embodiment shown, each wall segment 62b and 62d includes two stop arms 70 extending at or near a bottom edge 65 of the wall segments so that the stop arm 70 is positioned to engage the mounting tab 44 of the raised member 40 when the telescoping member 60 reaches the fully extended position. With the stop arm 70 positioned to engage or contact the mounting tab 44 of the raised member 40, as the telescoping member 60 is moved to the fully extended position by the drive members 90, the stop arm 70 moves toward the mounting tab 44 of the raised member 40. When the stop arm 70 contacts the mounting tab 44, the telescoping member 60 is in the fully extended position.

As shown in FIGS. 7 and 8, the telescoping member 60 includes one or more protective members 72 that are provided to prevent electrical wires withing an electrical box 500 from contacting the drive members 90. As noted above, in the embodiment shown there are four sets of mounting tabs 44 and 64, where the apertures 46 and 66 of the first mounting tab pair are aligned, the apertures 46 and 66 of the second mounting tab pair are aligned, the apertures 46 and 66 of a third mounting tab pair are aligned, and the apertures 46 and 66 of the fourth mounting tab pair are aligned. A first drive member 90 extends at least partially through the first mounting tab pair and is operatively coupled to the first mounting tab 44. A second drive member 90 extends at least partially through the second mounting tab pair and is operatively coupled to the second mounting tab 44. A third drive member 90 extends at least partially through the apertures 46 and 66 of the third mounting tab pair and is operatively coupled to the third mounting tab 44. And, a fourth drive member 90 extends at least partially through the apertures 46 and 66 of the fourth mounting tab pair and is operatively coupled to the fourth mounting tab 44. In this configuration, there are also four protective members 72. The first protective member 72 is associated with the first mounting tab pair and first drive member 90, the second protective member 72 is associated with the second mounting tab pair and the second drive member 90, the third protective member 72 is associated with the third mounting tab pair and the third drive member 90, and the fourth protective member 72 is associated with the fourth mounting tab pair and the fourth drive member 90. Each protective member 72 includes a shroud 74 and an alignment post 76. In one embodiment, the shroud 74 is integral with or monolithically formed into the wall 62 of the telescoping member 60. In another embodiment, the shroud 74 of the of the protective member 72 may be secured to the wall 62 by welds, adhesives or mechanical fasteners. The shroud 74 can extend from at or near the bottom edge 65 of the wall 62 toward the top edge 63 of the wall 62, or the shroud 74 can extend from the bottom edge 65 of the wall 62 to a point between the bottom edge 65 and the top edge 63 of the wall 62. In the exemplary embodiment shown, the shroud 74 extends from the bottom edge 65 of the wall segments 62b and 62d to a point between the bottom edge 65 and the top edge 63 of the wall 62 sufficient to prevent electrical wires within the electrical box 500 from contacting the drives members 90.

Referring again to FIGS. 7 and 8, the telescoping member 60 also includes one or more device mounting tabs 78 used to secure a device 510 to the mud ring assembly 10. In the embodiment shown, the telescoping member 60 includes six device mounting tabs 78 that extend from the top edge 63 of the wall 62 toward the opening 24. As noted above, the opening 24 is the combination of the opening in the base member 20, the opening in the raised member 40 and the opening in the telescoping member 60. The device mounting tabs 78 extend or protrude from the wall 62 so that they are substantially perpendicular to the wall 62. In the exemplary embodiment shown, the device mounting tabs 78 are positioned on opposite wall segments 62a and 62c of the telescoping member 60 and separated a sufficient distance so that a device can be secured to opposing device mounting tabs 78, as shown in FIGS. 1 and 2.

Referring again to FIG. 6, each of the one more drive members 90 is operatively coupled to a mounting tab 44 of the raised member 40 via the aperture 46. As such, the drive members 90 are positioned within the opening 24 of the mud ring assembly 10. In the exemplary embodiment shown, the mud ring assembly 10 includes four drive members 90. Each drive member 90 is a fastener including a threaded shank 92, a head 94 and a flange 96 positioned between the threaded shank 92 and the head 94. The head 94 fits within the aperture 66 in the mounting tab 64 and the flange 96 is provided to engage the mounting tab 64 to move the telescoping member 60 toward the fully extended position when the drive members are rotated counter-clockwise. To move the telescoping member 60 to the retracted position, the drive members 90 are rotated clockwise so that the flange 96 engages the interlocking members 68 of the telescoping member 60 to push the telescoping member 60 toward the retracted position. It is noted that the hook 68b of the interlocking members 68 wrap at least partially around the drive members 90, as shown in FIG. 6.

During installation, an installer can rotate the drive members 90 to thread or unthread the threaded shanks 92 relative to the mounting tabs 44, thus changing the position of the telescoping member 60 relative to the base member 20 and raised member 40. In this manner, the installer may adjust the depth of the telescoping member 60 between the retracted position and the fully extended position as necessary to accommodate various wall thicknesses and various box depths. As noted above, the stop arm 70 on the wall 62 of the telescoping member 60 engages the mounting tab 44 to prevent the telescoping member from moving past the fully extended position, and the mounting tabs 44 of the raised member 40 act as a stop to prevent the telescoping member 60 from moving past the retracted position.

Figure 16:
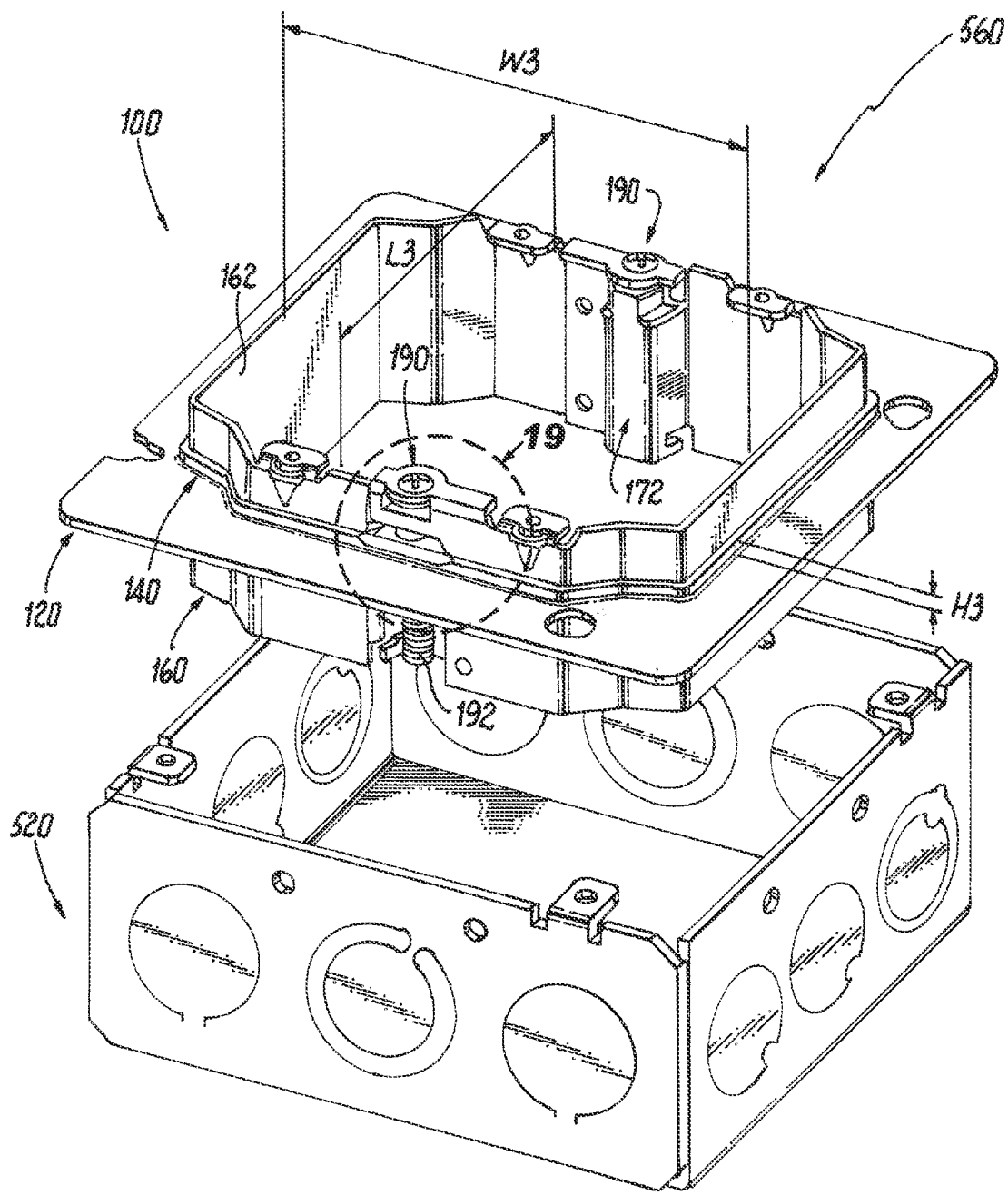
FIG. 16 is an exploded perspective view of the electrical box and adjustable mud ring of FIG. 14, illustrating the mud ring in the retracted position.
Figure 17:
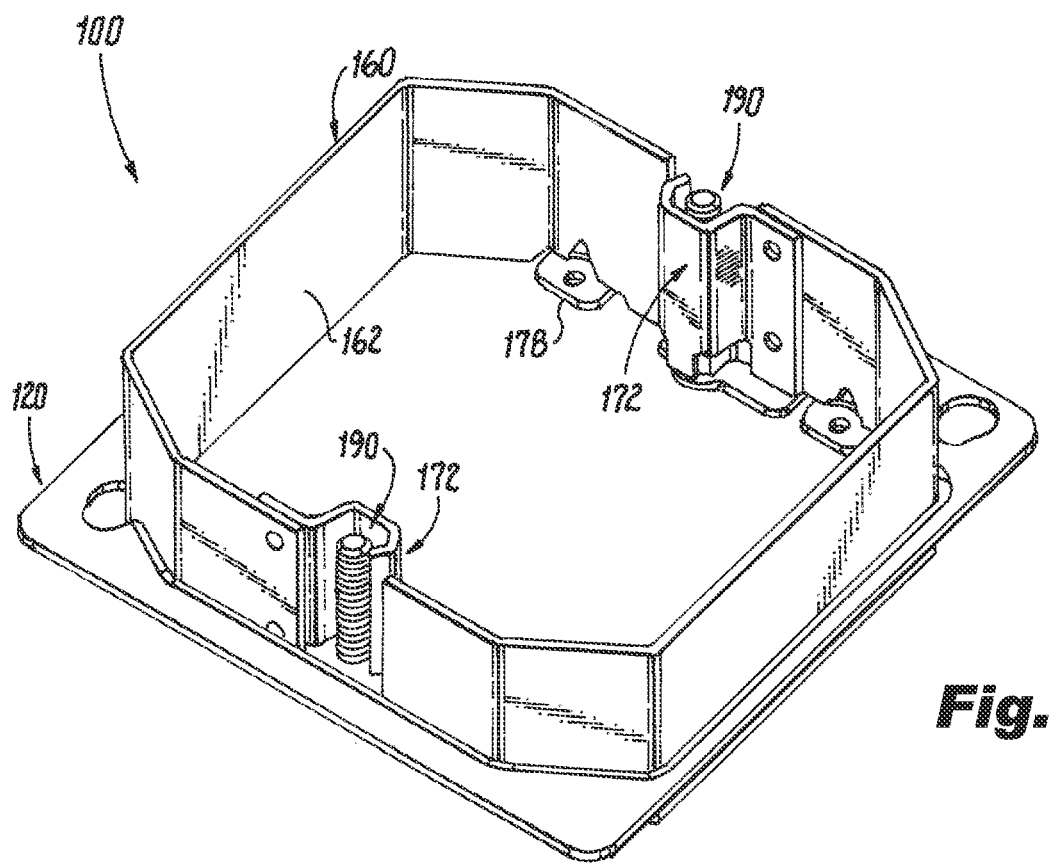
FIG. 17 is a bottom perspective view of the mud ring of FIG. 16.
Figure 21:
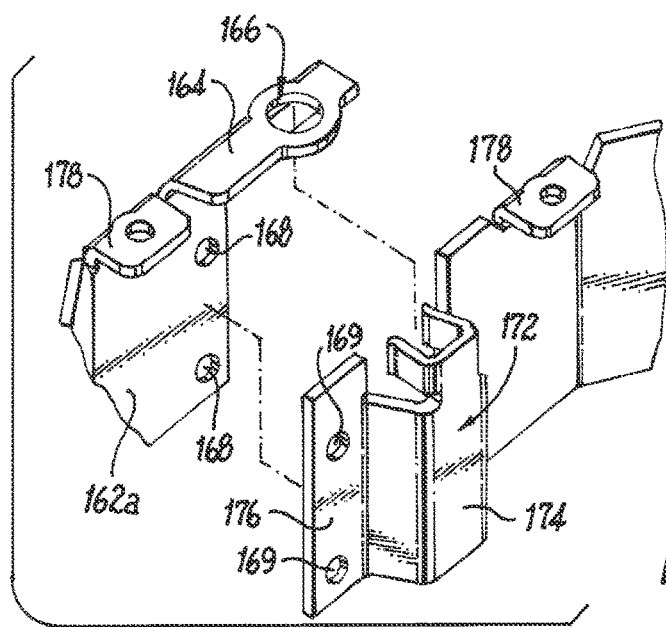
FIG. 21 is an enlarged perspective view of a portion of the telescoping member of FIG. 20 taken from detail 21, illustrating an interconnection of walls of the telescoping member.
Figure 22:
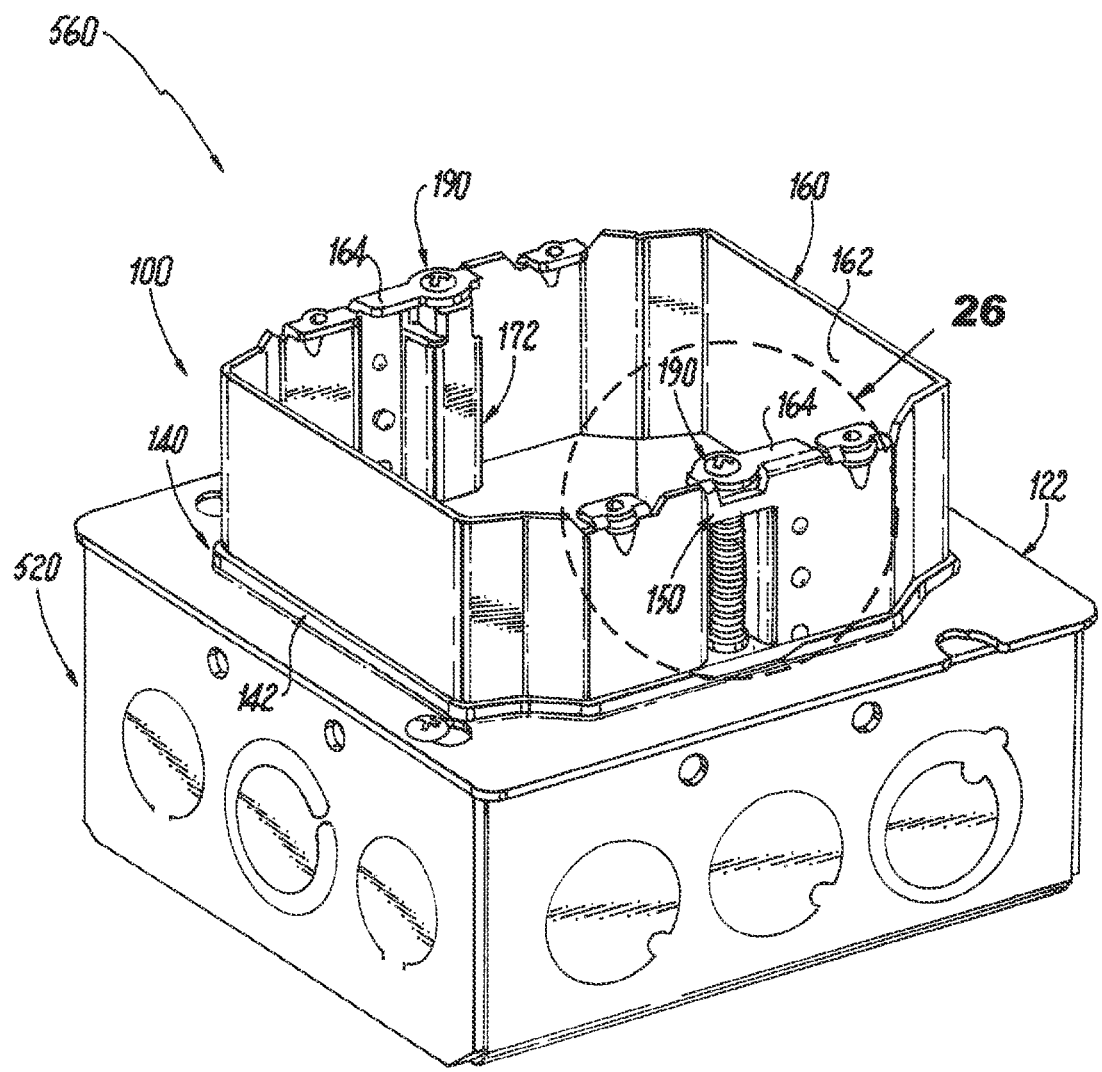
FIG. 22 is a perspective view of the electrical box and adjustable mud ring of FIG. 16, illustrating the mud ring in a fully extended position.

Referring now to FIGS. 16 and 22, another exemplary embodiment of a mud ring kit 560 is shown. The mud ring kit 560 includes a mud ring assembly 100 and an electrical box 520. In this exemplary embodiment, the electrical box 520 is sufficiently sized so that a two-gang mud ring assembly 100 can be secured to the electrical box. Referring to FIGS. 17-21 and 23-26, the exemplary two-gang mud ring assembly 100 according to the present disclosure includes a base member 120, a raised member 140, a movable or telescoping member 160, and one or more drive members 190.

Referring to FIGS. 16-19, the base member 120 includes a substantially planar flange 122 and an opening 124 in the flange. The flange 122 includes one or more mounting openings 126, e.g., keyhole slots, used for securing the base member 120 to a box 520. The raised member 140 of the mud ring assembly 100 extends from a top surface 122a of the flange 122 to provide a substantially rectangular or square wall 142 having a height "H3," seen in FIG. 16, and the inside opening 124 of the raised member has a length "L3" and a width "W3." The height "H3" of the wall 142 is preferably set to provide a minimum height to stabilize the telescoping member 160 within the opening 24 in the raised member 40 as the telescoping member moves between a retracted position and a fully extended position. For example, the height "H3" of the wall 142 of the raised member 40 may be between about 1/32 of an inch and about 1/2 of an inch. The inside opening 124 in the raised member 140 is preferably set to receive the telescoping member 160 and multiple devices 510, and may be less than an opening of the electrical box 520. For example, if the opening of a two-gang electrical box is in the range of about 4 inches by about 4 inches, the inside opening 124 would have a length "L3" in the range of about 3 inches to about 4 inches, and a width "W3" in the range of about 3 inches to about 4 inches. The raised member 140 extends substantially along or around the opening 124 of the base member 120. The raised member 140 may be integral with or monolithically formed into the base member 120. In another embodiment, the raised member 140 may be secured to the base member 120 using, for example, welds or mechanical fasteners. The raised member 140 includes one or more mounting tabs 144, seen in FIG. 18, that extend from the wall 142 of the raised member 140 into the opening 124 such that the mounting tabs 144 are substantially perpendicular to the wall 142. Each mounting tab 144 includes an aperture 146 configured and dimensioned to operatively interact with one of the one or more drive members 190 such that activation of the drive members 190 can move the telescoping member 160 between a retracted position, seen in FIGS. 26 and 27, and a fully extended position, seen in FIGS. 22 and 25. In the exemplary embodiment shown, the apertures 146 are threaded holes and the drive members 190 are threaded fasteners.

Figure 20:
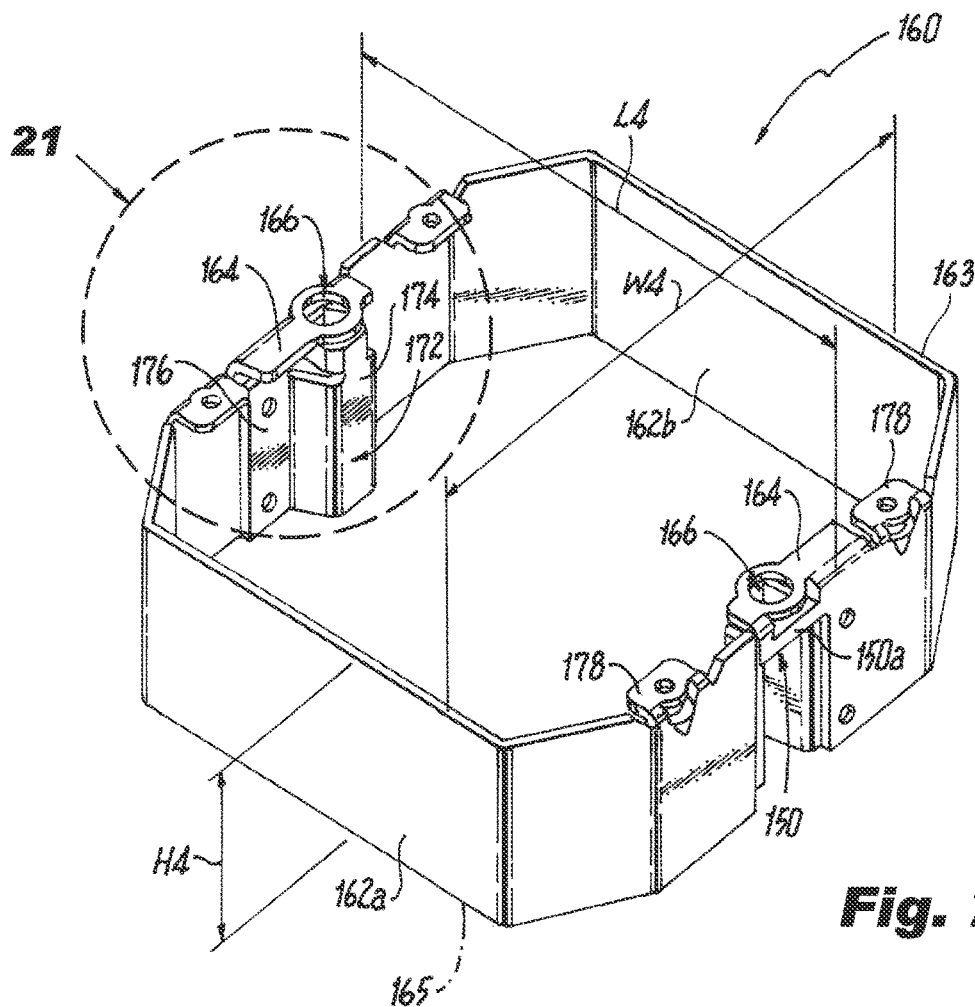
FIG. 20 is a perspective view of the telescoping member of FIG. 16, illustrating the walls of the telescoping member aligned for interconnection.

Referring to FIGS. 20 and 21, the telescoping member 160 includes a wall 162, e.g., a square or rectangular wall, that may be formed from a plurality of interlocking wall segments, or the square or rectangular wall 162 may be formed as a unitary or monolithic wall. In the embodiment shown, the wall 162 is formed from a plurality of interlocking wall segments 162a and 162b. In this exemplary embodiment, each wall segment 162a and 162b is a substantially U-shaped member that when interlocked form a substantially square shape. Each wall segment 162a and 62b has a height "H4," seen in FIG. 20, and when the wall segments are interlocked has an outer length "L4" and an outer width "W4," seen in FIG. 20. The height "H4" is preferably set to provide a desired maximum extension of the mud ring assembly 100. For example, if the desired maximum extension of the mud ring assembly 100 is to be about 1-2 inches, the height "H4" of the telescoping member 160 would be in the range of about 3/4 of an inch to about 2 inches. The outer length "L4" of the telescoping member 160 is less than the length "L3" of the of the raised member 140, and the outer width "W4" of the telescoping member 160 is less than the width "W3" of the of the raised member 40 so that the telescoping member 160 fits within the opening 124 within the raised member 140 so that the telescoping member 160 is movable relative to the base member 120 and the raised member 140. The raised member 140 extends the depth of the opening 124 to the inside of the telescoping member 160. Preferably, the outer length "L4" and the outer width "W4" are set to fit within a multi-gang, here a two-gang, electrical box 520 used for mounting electrical devices 510 to the mud ring assembly 100. For example, if the length and width of a two-gang electrical box 520 is in a range of about 4 inches by about 4 inches, the outer length "L4" would be in a range of about 3 inches to about 4 inches and the outer width "W4" would be in a range of about 3 inches to about 4 inches.

Figure 19:
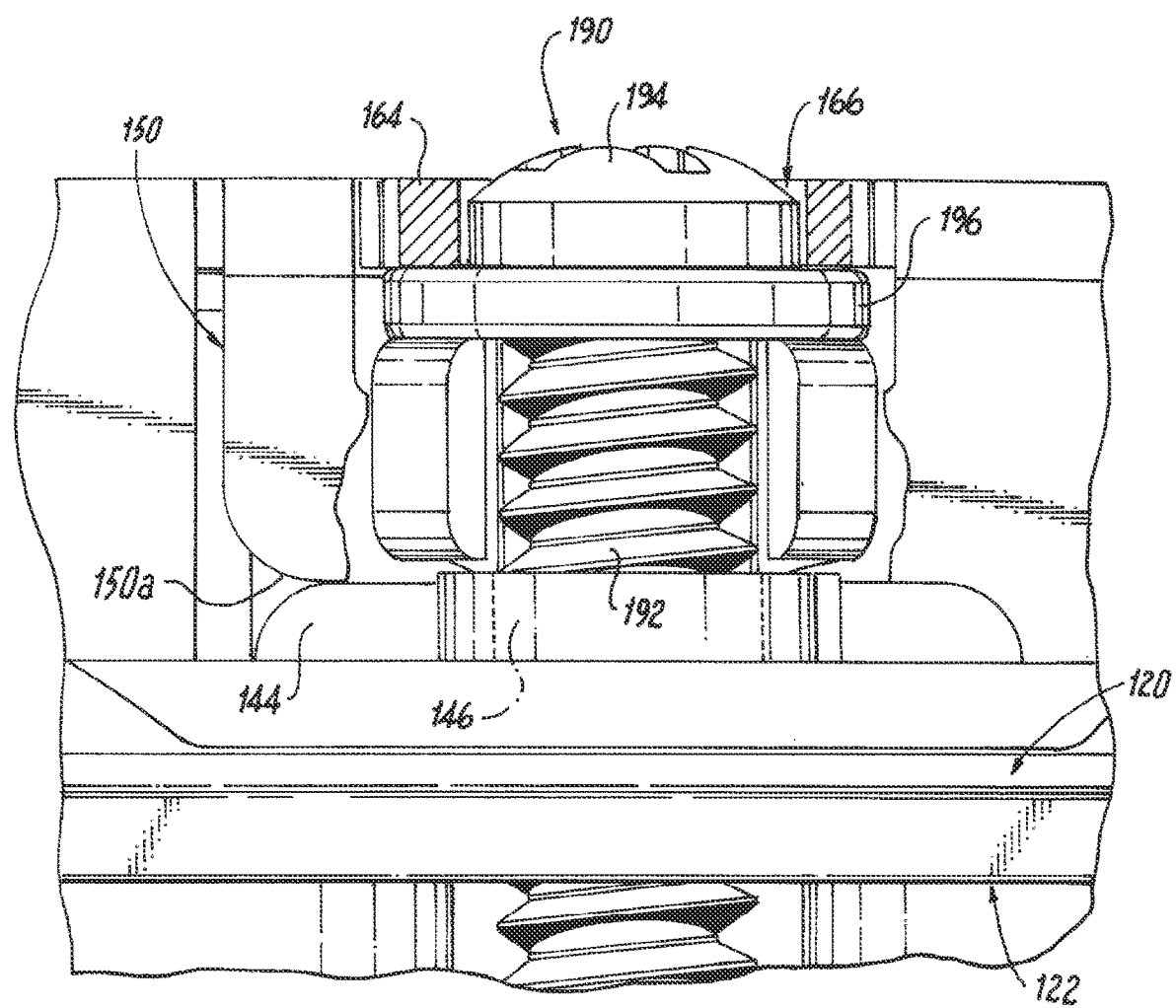
FIG. 19 is an enlarged side elevation view of a portion of the mud ring of FIG. 16 taken from detail 19, illustrating a fastener of the mud ring.

Continuing to refer to FIGS. 19-21, the telescoping member 160 includes one or more mounting tabs 164 that extend into the opening 124 such that the mounting tabs 164 are substantially perpendicular to the wall 162 of the telescoping member 160. In the exemplary embodiment shown, the wall segment 162*a* has one mounting tab 164 at one end of the wall segment that extends into the opening 124 of the telescoping member 160. Similarly, the wall segment 162*b* has one mounting tab 164 at one end of the wall segment that extends into the opening 124 of the telescoping member 160. However, it is noted that the mounting tabs 164 may be at any location along the wall segments 162*a* and 162*b*. The mounting tabs 164 are positioned on the wall segments 162*a* or 162*b* so that they align with a respective mounting tab 144 extending from the wall 142 of the raised member 140. Each mounting tab 164 includes an aperture 166, seen in FIGS. 20 and 21, configured and dimensioned to at least partially receive one of the one or more drive members 190, such that at least a portion of the drive member 190 can pass through mounting tab 164, as seen in FIG. 19. The apertures 166 of the mounting tabs 164 are aligned with the apertures 146 of the respective mounting tabs 144.

Figure 18:
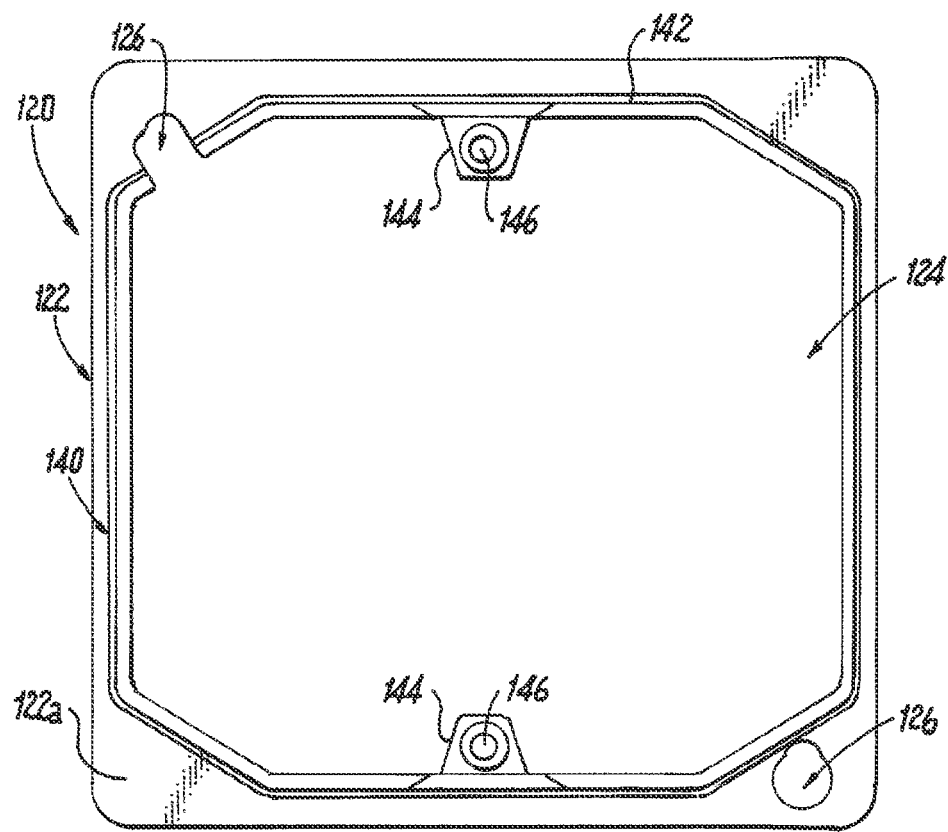
FIG. 18 is a top plan view of an exemplary embodiment of a base member of the adjustable mud ring of FIG. 16.

In the embodiment of FIGS. 14-26, there are two mounting tabs 144 on the raised member 140 and two mounting tabs 164 on the telescoping member 160. The mounting tabs 144 are positioned on opposite sides of the wall 142 of the raised member 140 in close proximity to a center of the wall 142, as shown in FIG. 18. Similarly, mounting tabs 164 are positioned on opposite sides of the wall 162 of the telescoping member 160 in close proximity to a center of the wall 162, as shown in FIG. 20. As shown in FIG. 19, a first mounting tab 144 of the raised member 140 is aligned with a first mounting tab 164 of the telescoping member 160 to form a first mounting tab pair. In this configuration, the aperture 146 in the first mounting tab 144 is aligned with the aperture 166 in the first mounting tab 164 so that a first drive member 190 can pass into operative engagement with the aperture 146. A head 194 of the first drive member 190 passes at least partially into the aperture 166 in the first mounting tab 164. Similarly, a second mounting tab 144 of the raised member 140 is aligned with a second mounting tab 164 of the telescoping member 160 to form a second mounting tab pair. In this configuration, the aperture 146 in the second mounting tab 144 is aligned with the aperture 166 in the second mounting tab 164 so that a second drive member 190 can pass into operative engagement with the aperture 146 in the second mounting tab 144. A head 194 of the second drive member 190 passes at least partially into the aperture 166 in the second mounting tab 164.

Continuing to refer to FIGS. 19-21, the wall segments 162*a* and 162*b* also include one or more interlocking members 168, which in the exemplary embodiment shown are dowels that engage corresponding circular holes 169 in the segment walls 162*a* and 162*b* include. The interlocking members 168 may be integrally or monolithic formed into the wall segments, e.g., wall segment 62*a* or 62*b*. In another embodiment, the interlocking members 168 may be separate members secured to the wall segments 162 using, for example, welds.

As shown in FIGS. 20-26, the telescoping member 160 includes one or more protective members 172 positioned at one end of each wall segment 162*a* and 162*b*, as shown. The one or more protective members 172 are provided to prevent electrical wires withing an electrical box 520 from contacting the drive members 190. As noted above, in the embodiment shown there are two pairs of mounting tabs 144 and 164, where the apertures 146 and 166 of the first mounting tab pair are aligned, and the apertures 146 and 166 of the second mounting tab pair are aligned. A first drive member 190 extends at least partially through the first mounting tab pair and is operatively coupled to the first mounting tab 144. A second drive member 190 extends at least partially through the second mounting tab pair and is operatively coupled to the second mounting tab 144. In this configuration, there are also two protective members 172. The first protective member 172 is associated with the first mounting tab pair and first drive member 190, and the second protective member 172 is associated with the second mounting tab pair and the second drive member 190. Each protective member 172, seen in FIGS. 20 and 21, includes a shroud 174 and an alignment post 176. In one embodiment, the shroud 174 is integral with or monolithically formed into the wall 162 of the telescoping member 160. In another embodiment, the shroud 174 of the of the protective member 172 may be secured to the wall 162 by welds, adhesives or mechanical fasteners. The shroud 174 can extend from at or near the bottom edge 165 of the wall 162 toward the top edge 163 of the wall 162, or the shroud 174 can extend from the bottom edge 165 of the wall 162 to a point between the bottom edge 165 and the top edge 163 of the wall 162. In the exemplary embodiment shown, the shroud 174 extends from the bottom edge 165 of the wall segments 162*a* and 162*b* to a point between the bottom edge 165 and the top edge 163 of the wall 162 sufficient to prevent electrical wires within the electrical box 520 from contacting the drives members 190.

Referring again to FIGS. 20 and 21, the wall segments 162*a* and 162*b* include one or more first stop arms 150 connected between the mounting tab 164 and the wall segment 162*a* or 162*b*, as seen in FIG. 20. A bottom edge 150*a* of the first stop arm 150 is spaced from the mounting tab 164 to a distance that preferably coincides with a minimum thickness of a surface covering material 530, seen in FIG. 20, through which a portion of the mud ring assembly 100 may extend. The first stop arm 150 is provided to engage the mounting tabs 144 on the raised member 140. More specifically, as the telescoping member 160 is being moved to the retracted position by the drive members 90, the mounting tabs 164 and the first stop arm 150 move toward the mounting tabs 144 of the raised member 140. When the bottom edge 150*a* of the first stop arms 150 contacts the mounting tabs 144, the telescoping member 160 is in the retracted position and the mounting tabs 144 stop the telescoping member 160 from moving through the opening 124 and through the base 120.

Figure 23:
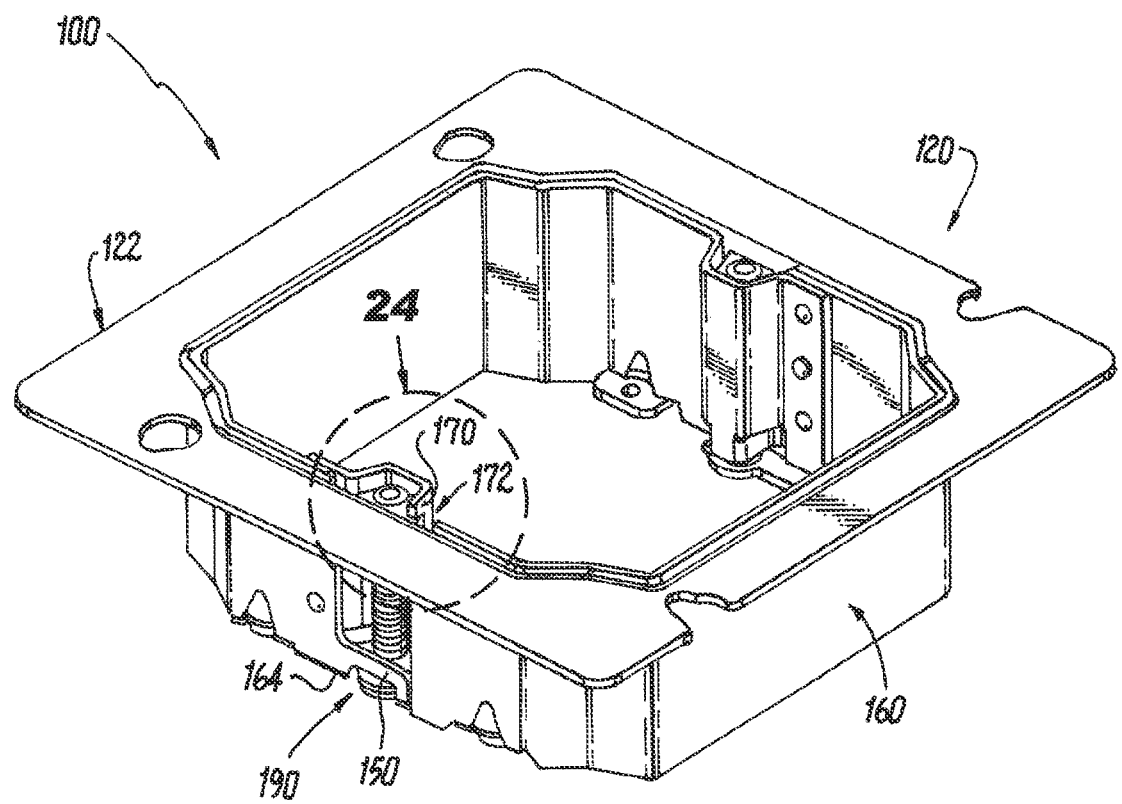
FIG. 23 is a bottom perspective view of the mud ring of FIG. 22.
Figure 24:
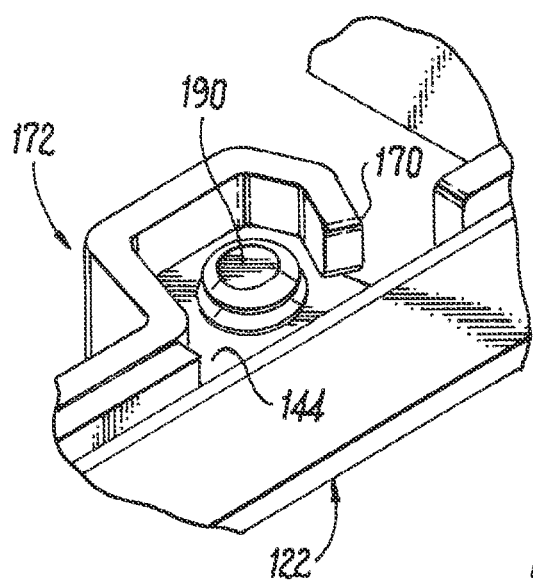
FIG. 24 is an enlarged plan view of a portion of the mud ring of FIG. 23 taken from detail 24.
Figure 25:
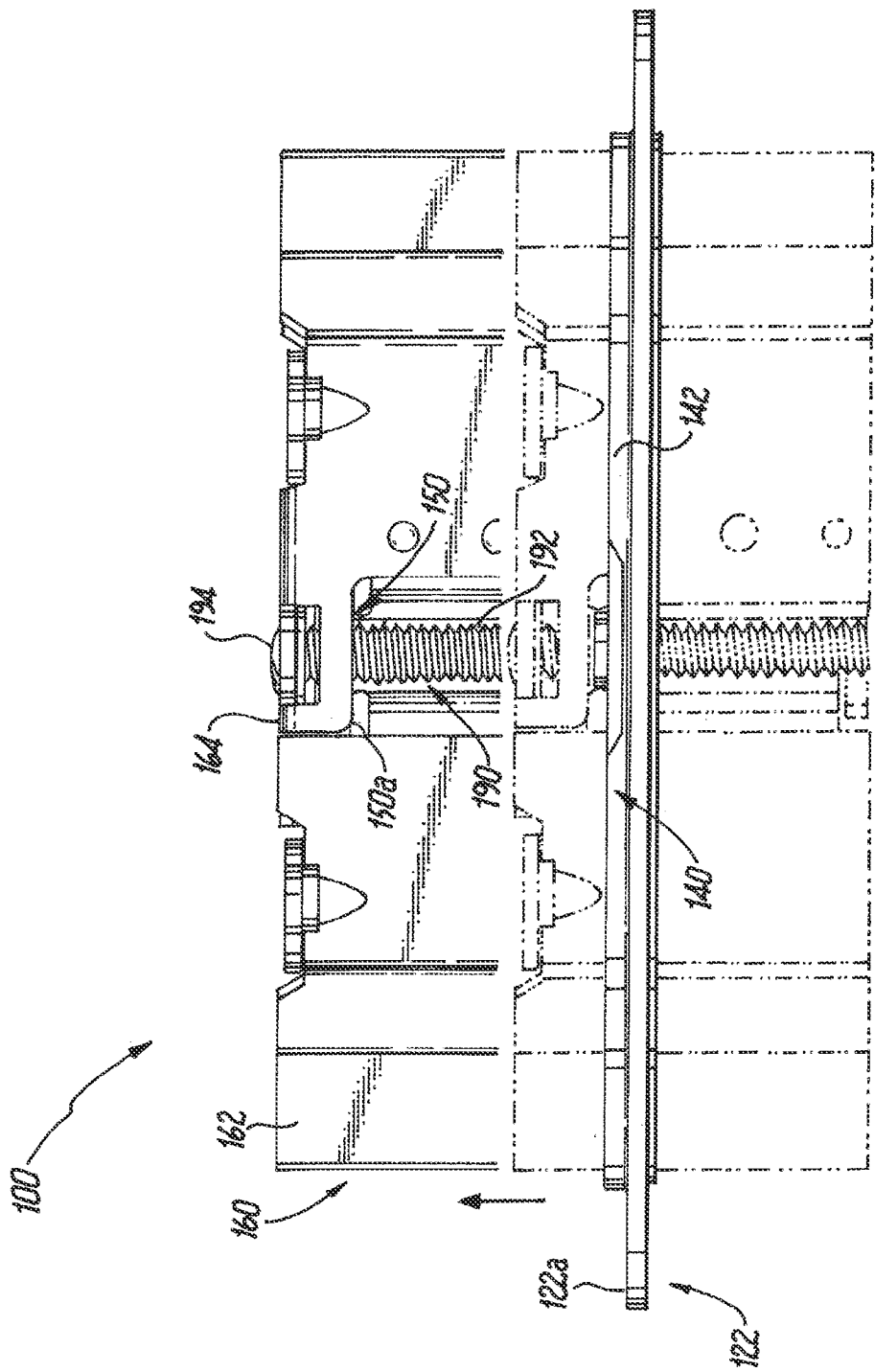
FIG. 25 is a first side elevation view of the mud ring of FIG. 22, illustrating a phantom line telescoping member in a partially extended position and a solid line telescoping member in the fully extended position.
Figure 26:
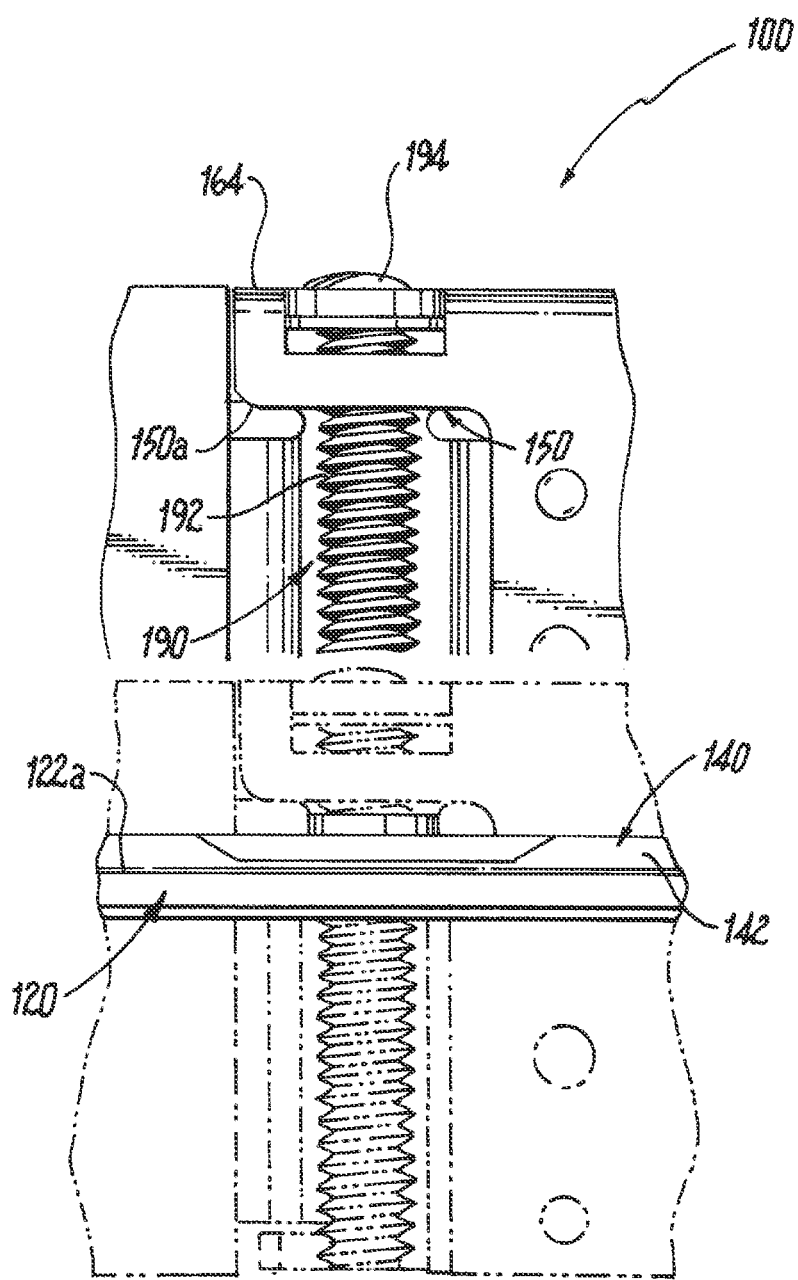
FIG. 26 is an end elevation view of a portion of the mud ring of FIG. 25.

Referring to FIGS. 23 and 24, the telescoping member 160 also includes one or more second stop arms 170 provided to stop movement of the telescoping member 160 when the telescoping member reaches the fully extended position, seen in FIG. 23. The stop arm 170 extends from the wall 162 at or near a bottom edge 65 so that the stop arm 170 is positioned to engage the mounting tab 144 of the raised member 140. In the exemplary embodiment shown, each wall segment 162*a* and 162*b* includes one stop arm 170 extending at or near a bottom edge 165 of the wall segments so that the stop arm 170 is positioned to engage the mounting tab 144 of the raised member 140 when the telescoping member 160 reaches the fully extended position, as seen in FIG. 24. More specifically, with the stop arms 170 positioned to engage or contact the mounting tabs 144 of the raised member 140, as the telescoping member 160 is moved to the fully extended position by the drive members 190 the stop arm 170 moves toward the mounting tab 144 of the raised member 140. When the stop arm 170 contacts the mounting tab 144, the telescoping member 160 is in the fully extended position.

Referring again to FIGS. 20 and 21, the telescoping member 160 also includes one or more device mounting tabs 178 used to secure a device 510 to the mud ring assembly 100. In the embodiment shown, the telescoping member 160 includes four device mounting tabs 178 that extend from the top edge 163 of the wall 162 into the opening 124 of the telescoping member 160. As noted above, the opening 124 is the combination of the opening in the base member 120, the opening in the raised member 140 and the opening in the telescoping member 160. The device mounting tabs 178 extend or protrude from the wall 162 so that they are substantially perpendicular to the wall 162. In the exemplary embodiment shown, the device mounting tabs 178 are positioned on opposite sides of the wall 162 of the telescoping member 160 and separated a sufficient distance so that a device 510 can be secured to opposing device mounting tabs 178, as shown in FIGS. 14 and 15.

Referring again to FIG. 19, each of the one more drive members 190 is operatively coupled to a mounting tab 144 of the raised member 140 via the aperture 146. As such, the drive members 190 are positioned within the opening 124 of the mud ring assembly 100. In the exemplary embodiment shown, the mud ring assembly 100 includes two drive members 190. Each drive member 190 is a fastener including a threaded shank 192, a head 194 and a flange 196 positioned between the threaded shank 192 and the head 194. The head 194 fits within the aperture 166 in the mounting tab 164 and the flange 196 is provided to engage the mounting tab 164 to move the telescoping member 160 toward the fully extended position when the drive members 190 are rotated counter-clockwise. To move the telescoping member 160 to the retracted position, the drive members 190 are rotated clockwise so that the flange 196 engages the first stop arm 150 of the telescoping member 160 to push the telescoping member 160 toward the retracted position.

During installation, an installer can rotate the drive members 190 to thread or unthread the threaded shanks 192 relative to the mounting tabs 144, thus changing the position of the telescoping member 160 relative to the base member 120 and raised member 140. In this manner, the installer may adjust the depth of the telescoping member 160 between the retracted position and the fully extended position as necessary to accommodate various wall thicknesses and various box depths. As noted above, the first stop arms 150 of the telescoping member 160 prevent the telescoping member 160 from moving past the retracted position, and the stop arms 170 on the wall 162 of the telescoping member 160 engages the mounting tab 144 to prevent the telescoping member from moving past the fully extended position.

Figure 29:
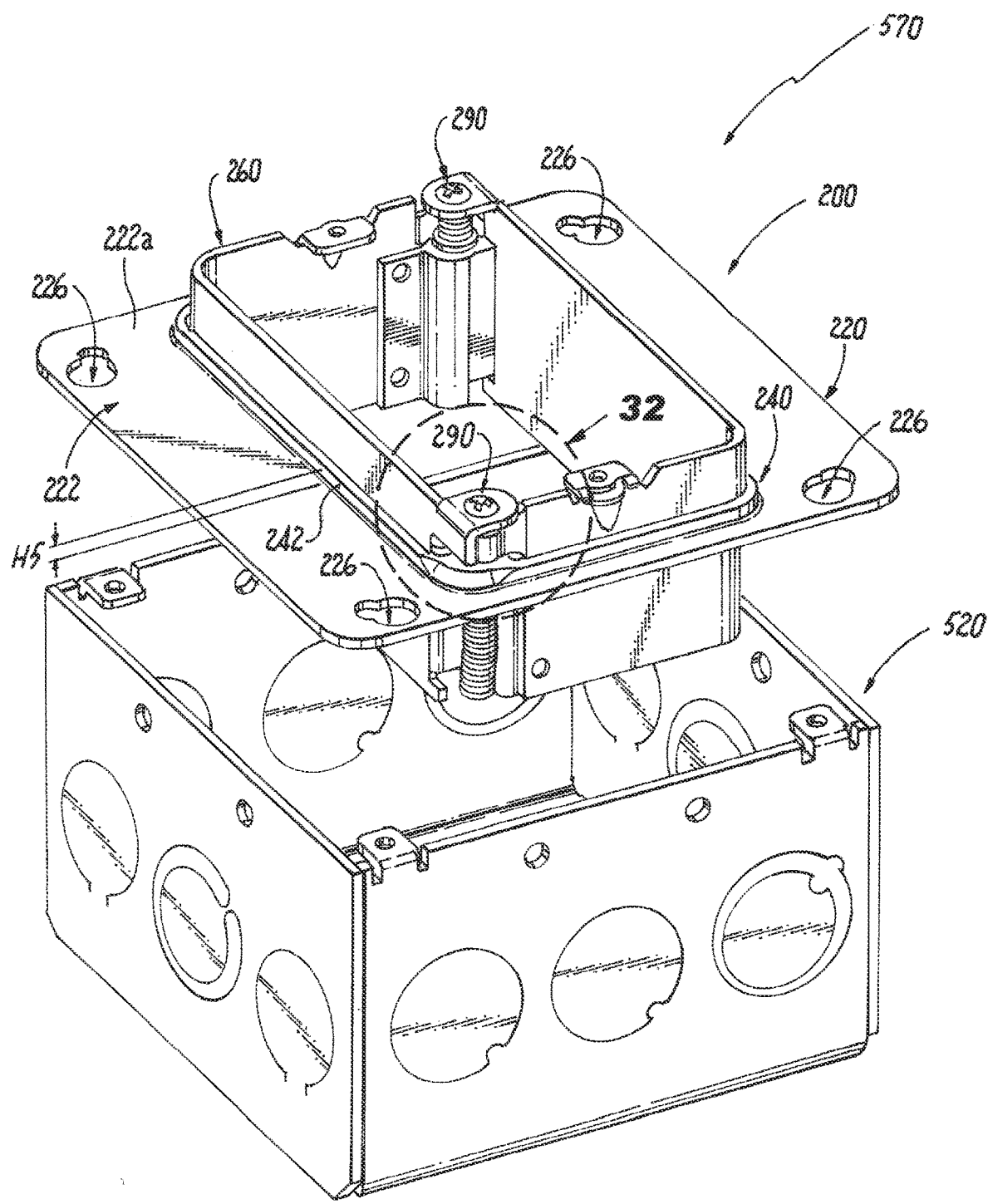
FIG. 29 is an exploded perspective view of the electrical box and adjustable mud ring of FIG. 27.
Figure 35:
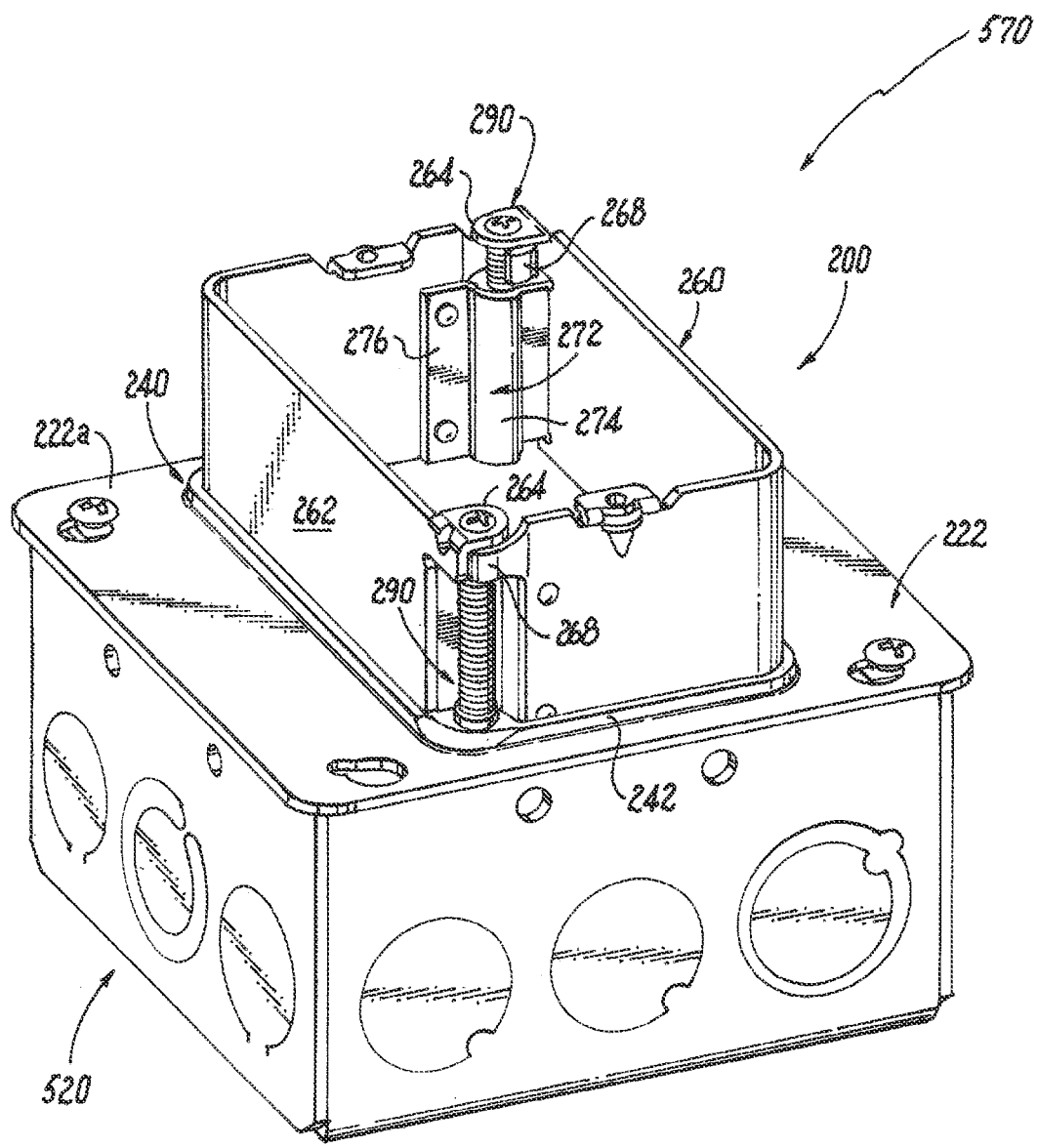
FIG. 35 is a perspective view of the electrical box and adjustable mud ring of FIG. 29, illustrating the mud ring in a fully extended position.

Referring now to FIGS. 29 and 35, another exemplary embodiment of a mud ring kit 570 is shown. The mud ring kit 570 includes a mud ring assembly 200 and an electrical box 520. In this exemplary embodiment, the electrical box 520 is sufficiently sized so that a single-gang mud ring assembly 200 can be secured to the electrical box. Referring to FIGS. 30-34 and 36-39, the exemplary single-gang mud ring assembly 200 according to the present disclosure includes a base member 220, a raised member 240, a movable or telescoping member 260, and one or more drive members 290.

Figure 30:
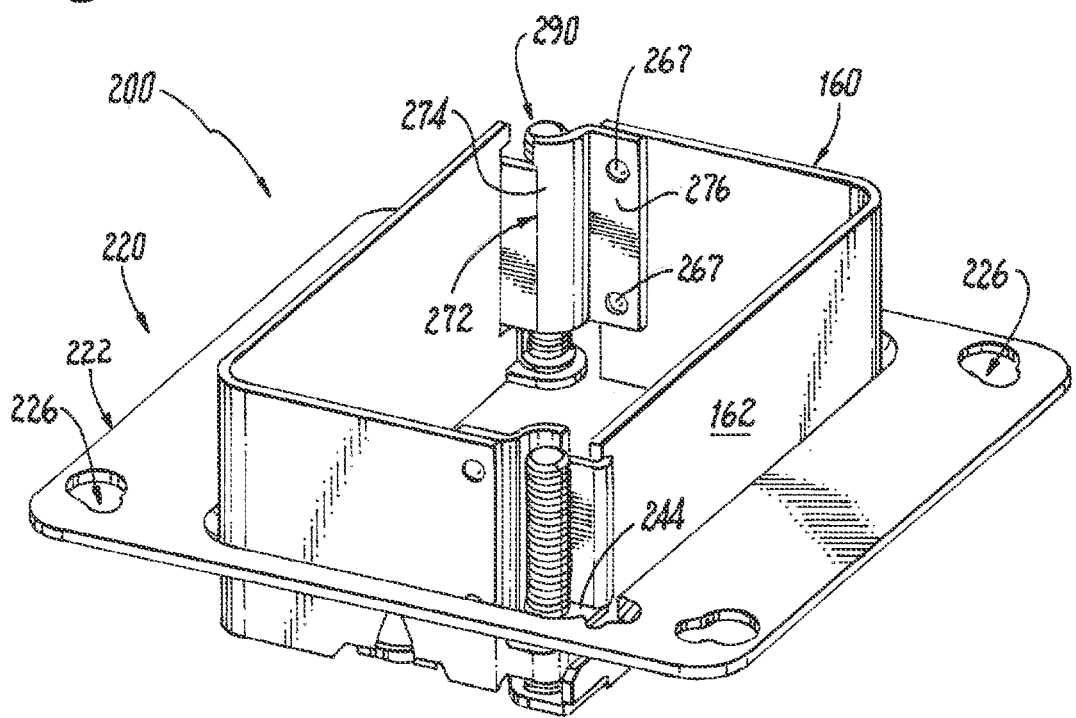
FIG. 30 is a bottom perspective view of the mud ring of FIG. 29.
Figure 31:
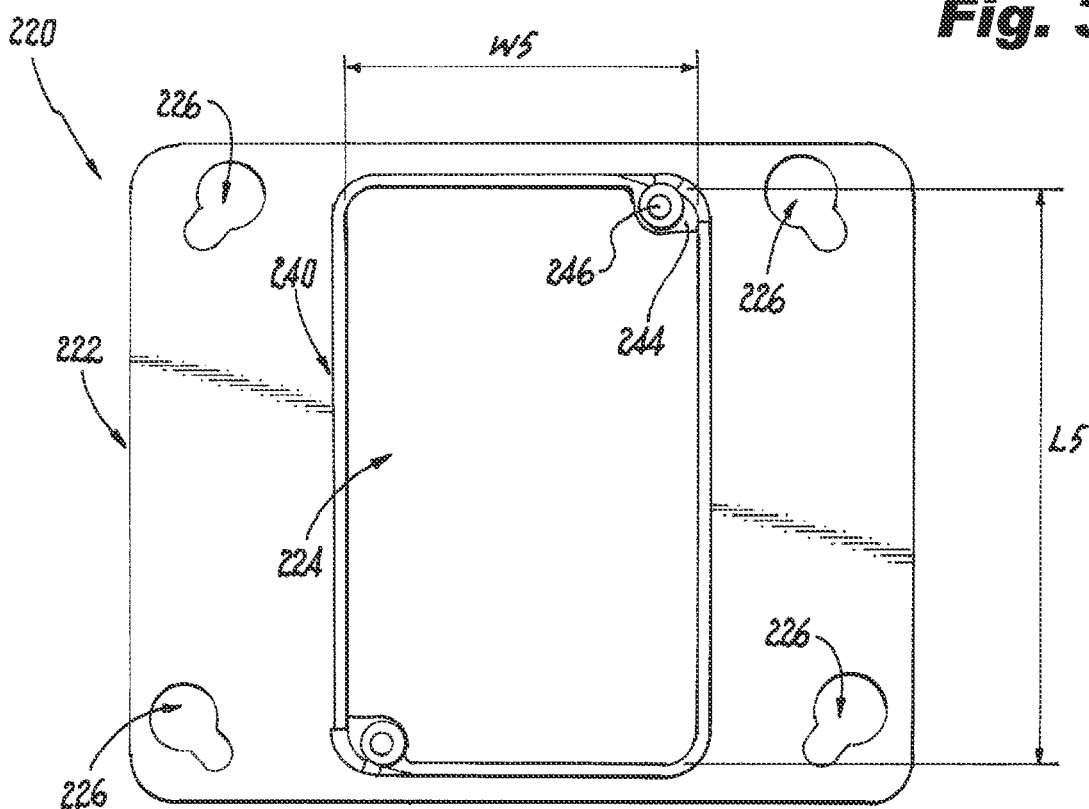
FIG. 31 is a top plan view of an exemplary embodiment of a base member of the adjustable mud ring of FIG. 29.

Referring to FIGS. 29-31, the base member 220 includes a substantially planar flange 222 and an opening 224 in the flange. The flange 222 includes one or more mounting openings 226, e.g., keyhole slots, used for securing the base member 220 to a box 520. The raised member 240 of the mud ring assembly 200 extends from a top surface 222a of the flange 222 to provide a substantially rectangular or square wall 242 having a height "H5," seen in FIG. 29, and the inside opening 224 of the raised member 240 has a length "L5" and a width "W5," seen in FIG. 31. The height "H5" of the wall 242 is preferably set to provide a minimum height to stabilize the telescoping member 260 within the opening 224 in the raised member 240 as the telescoping member 260 moves between a retracted position and a fully extended position. For example, the height "H5" of the wall 242 of the raised member 240 may be between about 1 inch and about 2 inches. The inside opening 224 of the raised member 240 is preferably set to receive the telescoping member 260 and a single device 510, and may be less than an opening of the electrical box 520. For example, if the opening of a two-gang electrical box is in the range of about 4 inches by about 4 inches, the inside opening 224 would have a length "L5" in the range of about 3 inches to about 4 inches, and a width "W5" in the range of about 1 inch to about 3 inches. The raised member 240 extends substantially along or around the opening 224 of the base member 220. The raised member 240 may be integral with or monolithically formed into the base member 220. In another embodiment, the raised member 240 may be secured to the base member 220 using, for example, welds or mechanical fasteners. The raised member 240 includes one or more mounting tabs 244, seen in FIG. 31, that extend from the wall 242 of the raised member 240 into the opening 224 such that the mounting tabs 244 are substantially perpendicular to the wall 242. Each mounting tab 244 includes an aperture 246 configured and dimensioned to operatively interact with one of the one or more drive members 290 such that activation of the drive members 290 can move the telescoping member 260 between a retracted position, seen in FIGS. 29 and 30, and a fully extended position, seen in FIGS. 35 and 36. In the exemplary embodiment shown, the apertures 246 are threaded holes and the drive members 290 are threaded fasteners.

Referring to FIGS. 33 and 34, the telescoping member 260 includes a wall 262, e.g., a square or rectangular wall, that may be formed from a plurality of interlocking wall segments, or the square or rectangular wall 262 may be formed as a unitary or monolithic wall. In the embodiment shown, the wall 262 is formed from a plurality of interlocking wall segments 262a and 262b. In this exemplary embodiment, each wall segment 262a and 262b is an L-shaped like member that when interlocked form a substantially square shape. Each wall segment 262a and 262b has a height "H6," seen in FIG. 33, and when the wall segments are interlocked has an outer length "L6" and an outer width "W6," seen in FIG. 33. The height "H6" is preferably set to provide a desired maximum extension of the mud ring assembly 200. For example, if the desired maximum extension of the mud ring assembly 200 is to be about 1-2 inches, the height "H6" of the telescoping member 260 would be in the range of about 1 inch to about 2 inches. The outer length "L6" of the telescoping member 260 is less than the length "L5" of the of the raised member 240, and the outer width "W6" of the telescoping member 260 is less than the width "W5" of the of the raised member 240 so that the telescoping member 260 fits within the opening 224 within the raised member 240 so that the telescoping member 260 is movable relative to the base member 220 and the raised member 240. The raised member 240 extends the depth of the opening 224 to the inside of the telescoping member 260. Preferably, the outer length "L6" and the outer width "W6" are set to fit within a multi-gang, here a two-gang, electrical box 520 used for mounting electrical devices 510, seen in FIGS. 40 and 41, to the mud ring assembly 200. For example, if the length and width of a two-gang electrical box 520 is in a range of about 4 inches by about 4 inches, the outer length "L6" would be in a range of about 3 inches to about 4 inches and the outer width "W6" would be in a range of about 1 inch to about 3 inches.

Figure 32:
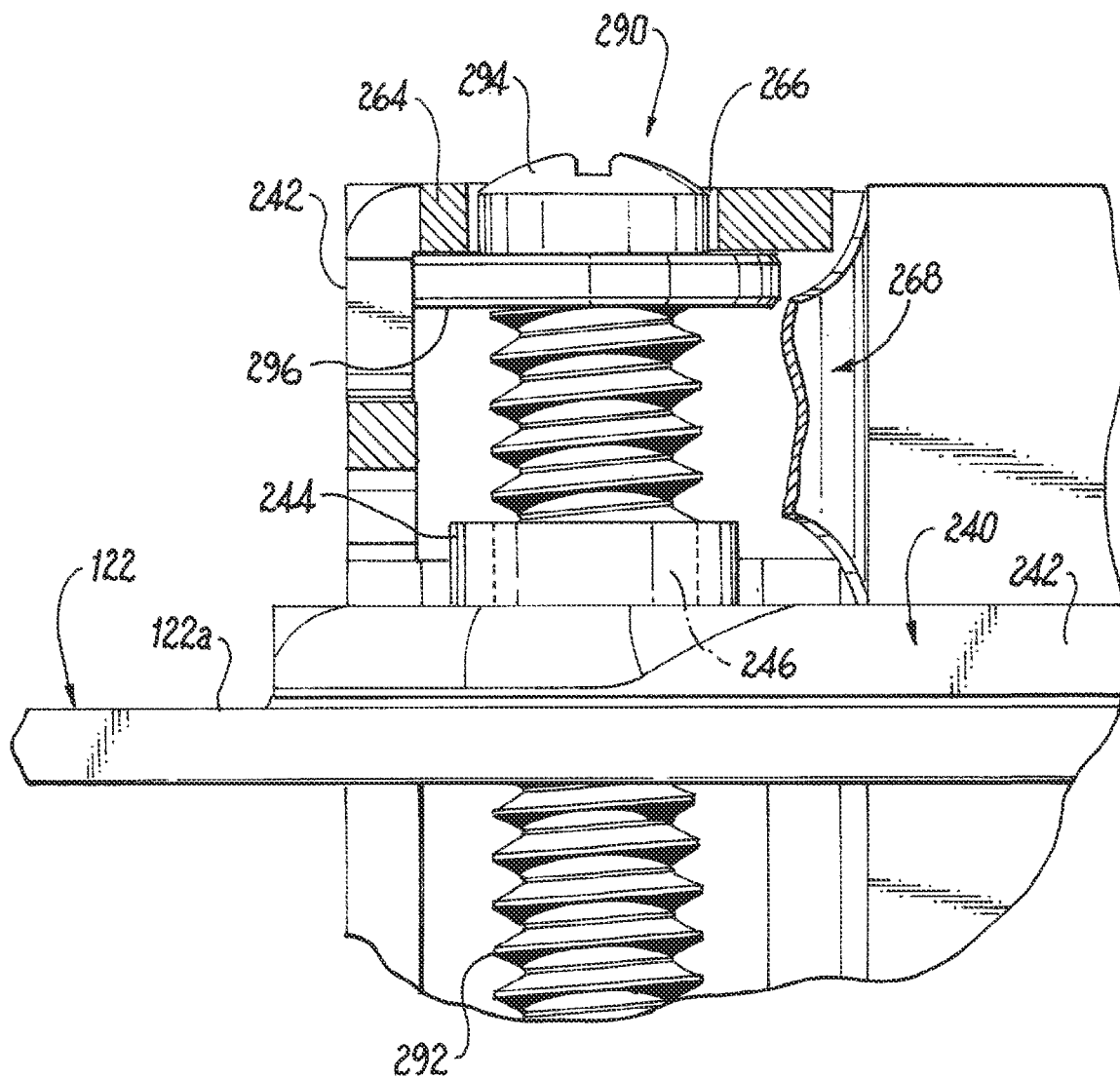
FIG. 32 is an enlarged side elevation view of a portion of the mud ring of FIG. 29 taken from detail 32, illustrating a fastener of the mud ring.

Continuing to refer to FIGS. 33 and 34, the telescoping member 260 includes one or more mounting tabs 264 that extend into the opening 224 of the telescoping member 260 such that the mounting tabs 264 are substantially perpendicular to the wall 262 of the telescoping member 260. In the exemplary embodiment shown, the wall segment 262a has one mounting tab 264 at one end of the wall segment that extends into the opening 224. Similarly, the wall segment 262b has one mounting tab 264 at one end of the wall segment that extends into the opening 224. However, it is noted that the mounting tabs 264 may be at any location along the wall segments 262a and 262b. The mounting tabs 264 are positioned on the wall segments 262a or 262b so that they align with a respective mounting tab 244 extending from the wall 242 of the raised member 240. Each mounting tab 264 includes an aperture 266, seen in FIGS. 33 and 34, configured and dimensioned to at least partially receive one of the one or more drive members 290, such that at least a portion of the drive member 290 can pass through mounting tab 264, as seen in FIGS. 32 and 35. The apertures 266 of the mounting tabs 264 are aligned with the apertures 246 of the respective mounting tabs 244.

In the embodiment of FIGS. 27-39, there are two mounting tabs 244 on the raised member 240 and two mounting tabs 264 on the telescoping member 260. The mounting tabs 244 are positioned on opposite sides of the wall 242 of the raised member 240 in close proximity to a center of the wall 242, as shown in FIG. 31. Similarly, mounting tabs 264 are positioned on opposite sides of the wall 262 of the telescoping member 260 in close proximity to a center of the wall 262, as shown in FIGS. 31 and 32. As shown in FIG. 32, a first mounting tab 244 of the raised member 240 is aligned with a first mounting tab 264 of the telescoping member 260 to form a first mounting tab pair. In this configuration, the aperture 246 in the first mounting tab 244 is aligned with the aperture 266 in the first mounting tab 264 so that a first drive member 290 can pass into operative engagement with the aperture 246. A head 294 of the first drive member 290 passes at least partially into the aperture 266 in the first mounting tab 264. Similarly, a second mounting tab 244 of the raised member 240 is aligned with a second mounting tab 264 of the telescoping member 260 to form a second mounting tab pair. In this configuration, the aperture 246 in the second mounting tab 244 is aligned with the aperture 266 in the second mounting tab 264 so that a second drive member 290 can pass into operative engagement with the aperture 246 in the second mounting tab 244. A head 294 of the second drive member 290 passes at least partially into the aperture 266 in the second mounting tab 264.

Continuing to refer to FIGS. 33 and 34, the wall segments 262a and 262b also include one or more interlocking members 267 and 268. The interlocking members 267, which in the exemplary embodiment shown, are dowels that engage corresponding circular holes 269 in the segment walls 262a and 262b. The interlocking members 267 may be integrally or monolithic formed into the wall segments, e.g., wall segment 262a or 262b. In another embodiment, the interlocking members 267 may be separate members secured to the wall segments 262 using, for example, welds. Interlocking members 268, seen in FIG. 34, which in the exemplary embodiment shown, are hook shaped members with an arm 268a and a hook 268b. The arm 268a extends from the wall segment 262a or 262b so that the arm 268a is substantially perpendicular to a side edge of the wall segment. The hook 268b is attached to the arm 268a as shown in FIGS. 33 and 34. The interlocking members 268 may be integrally or monolithic formed into the wall segment, e.g., wall segment 262a or 262b. In another embodiment, the interlocking members 268 may be separate members secured to the wall segments 262 using welds or mechanical fasteners. Similarly, the arm 268a and hook 268b may be integrally of monolithically formed members, or the arm 268a and hook 268b may be separate members joined together using, for example, welds.

As shown in FIGS. 33 and 34, the telescoping member 260 includes one or more protective members 272 positioned at one end of each wall segment 262a and 262b, as shown. The one or more protective members 272 are provided to prevent electrical wires withing an electrical box 520 from contacting the drive members 290. As noted above, in the embodiment shown there are two pairs of mounting tabs 244 and 264, where the apertures 246 and 266 of the first mounting tab pair are aligned, and the apertures 246 and 266 of the second mounting tab pair are aligned. A first drive member 290 extends at least partially through the first mounting tab pair and is operatively coupled to the first mounting tab 244. A second drive member 290 extends at least partially through the second mounting tab pair and is operatively coupled to the second mounting tab 244. In this configuration, there are also two protective members 272. A first protective member 272 is associated with the first mounting tab pair and the first drive member 290, and the second protective member 272 is associated with the second mounting tab pair and the second drive member 290. Each protective member 272 includes a shroud 274 and an alignment post 276. In one embodiment, the shroud 274 extends from the alignment post 276. The shroud 274 may be integral with or monolithically formed into the alignment post 276, or the shroud 274 of the of the protective member 272 may be secured to the alignment post 276 by welds, adhesives or mechanical fasteners. The alignment post 276 is interlocked with the wall 262 using the interlocking members 267. The shroud 274 can extend from the wall 262 at or near the bottom edge 265 toward the top edge 263 of the wall 262, or the shroud 274 can extend from the bottom edge 265 of the wall 262 to a point between the bottom edge 265 and the top edge 263 of the wall 262. In the exemplary embodiment shown, the shroud 274 extends from the bottom edge 265 of the wall segments 262a and 262b to a point between the bottom edge 265 and the top edge 263 of the wall 262 sufficient to prevent electrical wires within the electrical box 520 from contacting the drives members 290.

Figure 36:
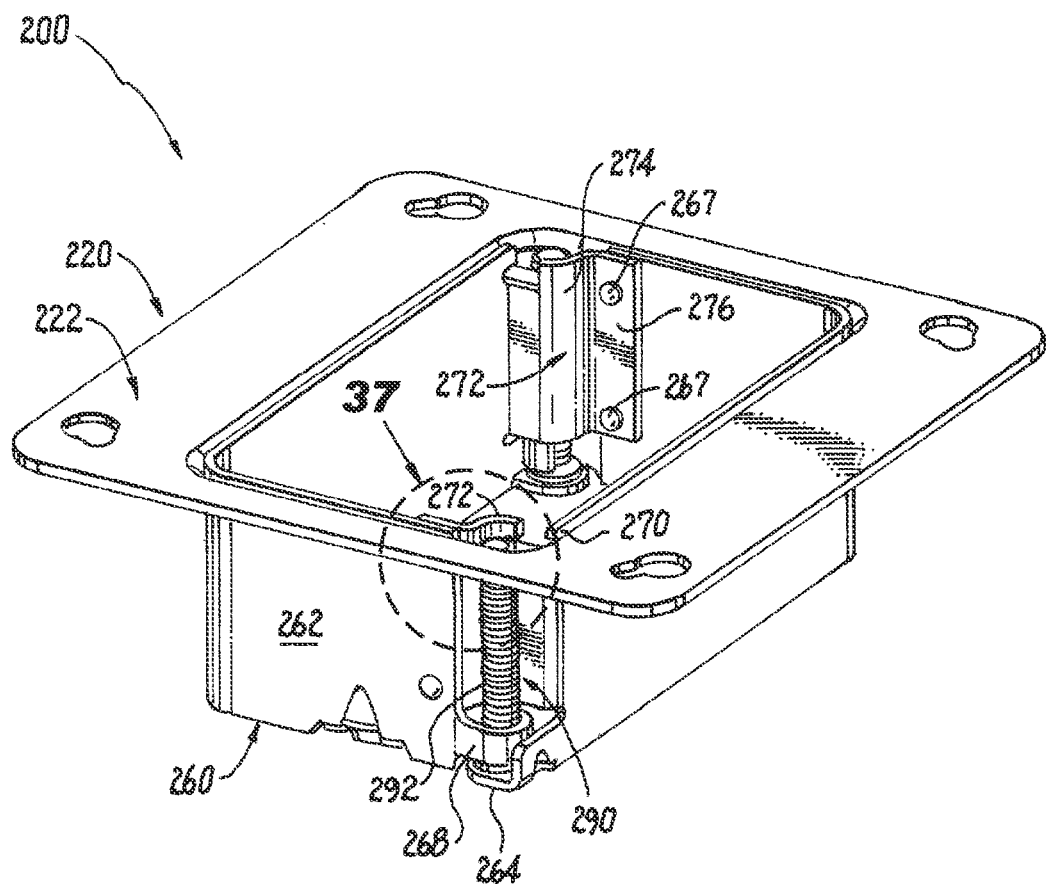
FIG. 36 is a bottom perspective view of the mud ring of FIG. 35.
Figure 37:
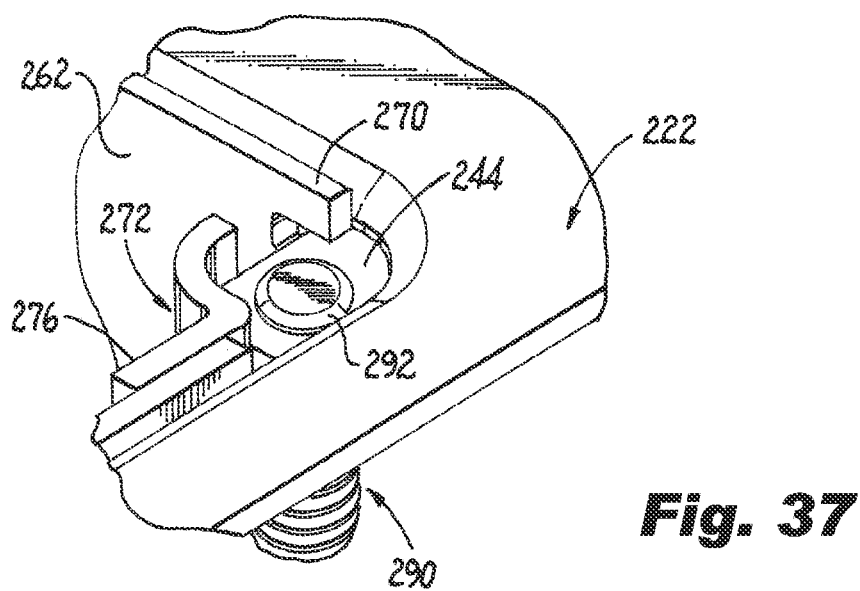
FIG. 37 is an enlarged perspective view of a portion of the mud ring of FIG. 36 taken from detail 37.
Figure 38:
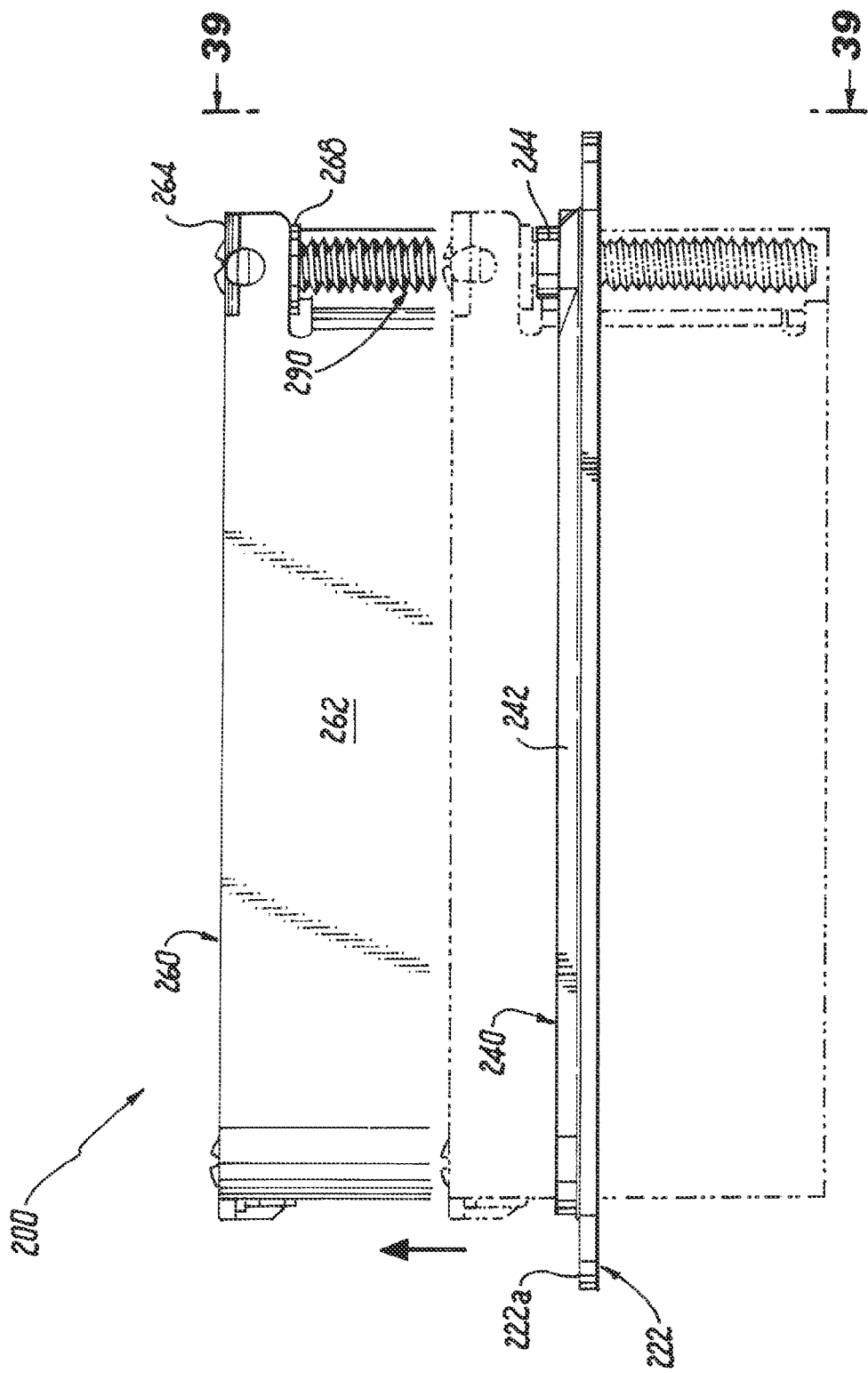
FIG. 38 is a side elevation view of the mud ring of FIG. 35, illustrating a phantom line telescoping member in a partially extended position and a solid line telescoping member in the fully extended position.
Figure 39:
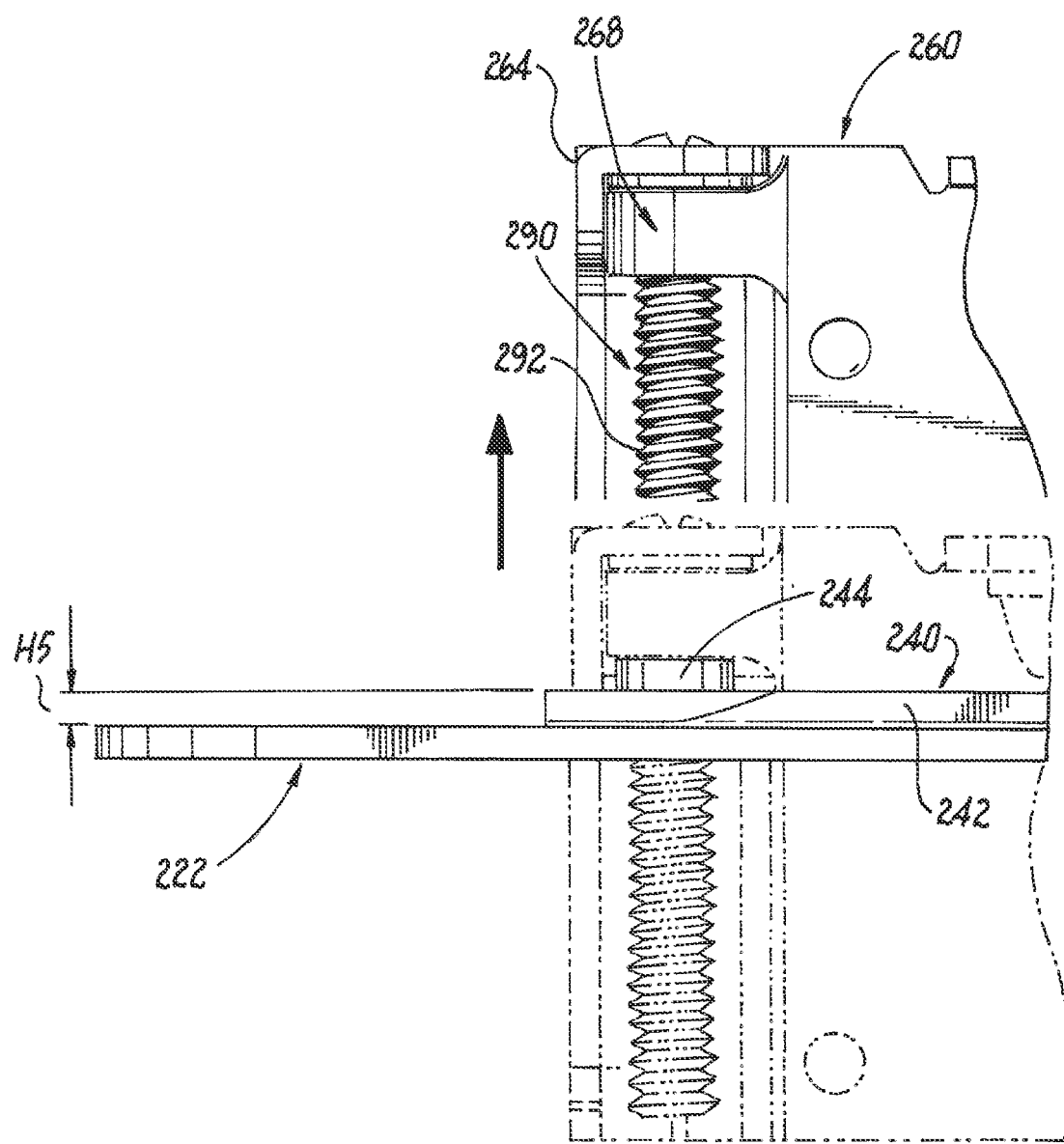
FIG. 39 is an end elevation view of a portion of the mud ring of FIG. 38.

Referring to FIGS. 33 and 34, the telescoping member 260 also includes one or more stop arms 270 provided to stop movement of the telescoping member 260 when the telescoping member reaches the fully extended position, seen in FIGS. 36 and 37. The stop arms 270 extend from the wall 262 at or near a bottom edge 265 so that the stop arms 270 are positioned to engage the mounting tabs 244 of the raised member 240. In the exemplary embodiment shown, each wall segment 262a and 262b includes one stop arm 270 extending at or near a bottom edge 265 of the wall segments so that the stop arm 270 is positioned to engage a mounting tab 244 of the raised member 240 when the telescoping member 260 reaches the fully extended position, as seen in FIGS. 36 and 37. More specifically, with the stop arms 270 positioned to engage or contact the mounting tab 244 of the raised member 240, as the telescoping member 260 is moved to the fully extended position by the drive members 290 the stop arms 270 move toward the mounting tabs 244 of the raised member 240. When the stop arms 270 contacts the mounting tab 244, the telescoping member 260 is in the fully extended position.

Referring again to FIG. 33, the telescoping member 260 also includes one or more device mounting tabs 278 used to secure a device 510 to the mud ring assembly 200. In the embodiment shown, the telescoping member 260 includes two device mounting tabs 278 that extend from the top edge 263 of the wall 262 into the opening 224 of the telescoping member 260. As noted above, the opening 224 is the combination of the opening in the base member 220, the opening in the raised member 240 and the opening in the telescoping member 260. The device mounting tabs 278 extend or protrude from the wall 262 so that they are substantially perpendicular to the wall 262. In the exemplary embodiment shown, the device mounting tabs 278 are positioned on opposite sides of the wall 262 of the telescoping member 260 and separated a sufficient distance so that a device 510 can be secured to the device mounting tabs 278, as shown in FIGS. 27 and 28.

Referring again to FIG. 32, each of the one more drive members 290 is operatively coupled to a mounting tab 244 of the raised member 240 via the aperture 246. As such, the drive members 290 are positioned within the opening 224 of the mud ring assembly 200. In the exemplary embodiment shown, the mud ring assembly 200 includes two drive members 290. Each drive member 290 is a fastener including a threaded shank 292, a head 294 and a flange 296 positioned between the threaded shank 292 and the head 294. The head 294 fits within the aperture 266 in the mounting tab 264 and the flange 296 is provided to engage the mounting tab 264 to move the telescoping member 260 toward the fully extended position when the drive members 290 are rotated counter-clockwise. To move the telescoping member 260 to the retracted position, the drive members 290 are rotated clockwise so that the flange 296 engages the interlocking member 268 of the telescoping member 260 to push the telescoping member 260 toward the retracted position.

During installation, an installer can rotate the drive members 290 to thread or unthread the threaded shanks 292 relative to the mounting tabs 244, thus changing the position of the telescoping member 260 relative to the base member 220 and raised member 240. In this manner, the installer may adjust the depth of the telescoping member 260 between the retracted position and the fully extended position as necessary to accommodate various wall thicknesses and various box depths. As noted above, the interlocking members 268 of the telescoping member 260 prevent the telescoping member 260 from moving past the retracted position, and the stop arms 270 on the wall 262 of the telescoping member 260 engages the mounting tab 244 to prevent the telescoping member from moving past the fully extended position.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A mud ring assembly for supporting an electrical device, the mud ring assembly comprising:

a base member having a flange and a substantially rectangular or square opening through the flange;

a raised member extending from the base member, the raised member following the opening in the flange to form a substantially rectangular or square raised wall, the raised member having a plurality of mounting tabs extending from the raised wall toward the opening;

a telescoping member positioned within the raised member and movable within the raised member between a retracted position and an extended position, the telescoping member having a substantially rectangular or square wall and a plurality of mounting tabs extending from the wall toward a center of the opening, wherein one of the plurality of mounting tabs of the telescoping member is aligned with one of the mounting tabs on the raised member to define a mounting tab pair; and a plurality of drive members, wherein one of the plurality of drive members is operatively coupled to the mounting tabs of one of the mounting tab pairs such that rotation of the drive member causes the telescoping member to move between the retracted position and the extended position.

2. The mud ring assembly according to claim 1, wherein each of the plurality of mounting tabs extending from the raised wall is substantially perpendicular to the raised wall.

3. The mud ring assembly according to claim 1, wherein the raised member is monolithically formed into the base member or secured to the base member.

4. The mud ring assembly according to claim 1, wherein each mounting tab extending from the raised wall includes an aperture to receive at least a portion of one of the plurality of drive members.

5. The mud ring assembly according to claim 1, wherein the telescoping member comprises a single monolithic structure or at least two interlinked members.

6. The mud ring assembly according to claim 1, wherein each of the plurality of mounting tabs extending from the rectangular or square wall is substantially perpendicular to the rectangular or square wall.

7. The mud ring assembly according to claim 1, wherein each mounting tab extending from the rectangular or square wall includes an aperture to receive at least a portion of one of the plurality of drive members.

8. The mud ring assembly according to claim 1, wherein each of the plurality of drive members comprises a fastener.

9. The mud ring assembly according to claim 1, wherein the rectangular or square wall includes a plurality of protective members, and wherein one of the plurality of protective members is positioned in proximity to one of the mounting tab pairs.

10. A mud ring assembly for supporting an electrical device, the mud ring assembly comprising:

a base member having a flange and a substantially rectangular or square opening through the flange;

a raised member extending from the base member, the raised member following the opening in the flange to form a substantially rectangular or square raised wall, the raised member having a plurality of mounting tabs extending from the raised wall toward a center of the opening, the plurality of mounting tabs being substantially perpendicular to the raised wall;

a telescoping member positioned within the raised member and movable within the raised member between a retracted position and an extended position, the telescoping member having a substantially rectangular or square wall and a plurality of mounting tabs extending from the rectangular or square wall toward a center of the rectangular or square opening and substantially perpendicular to the rectangular or square wall, wherein one of the plurality of mounting tabs is aligned with one of the mounting tabs on the raised member to define a mounting tab pair, the telescoping wall including a plurality of protective members wherein one of the plurality of protective members is positioned in proximity to one of the mounting tab pairs; and a plurality of drive members, wherein one of the plurality of drive members is operatively coupled to the mounting tabs of one of the mounting tab pairs such that rotation of the drive member causes the telescoping member to move between the retracted position and the extended position.

11. The mud ring assembly according to claim 10, wherein the raised member is monolithically formed into the base member or secured to the base member.

12. The mud ring assembly according to claim 10, wherein each mounting tab extending from the raised wall includes an aperture to receive at least a portion of one of the plurality of drive members.

13. The mud ring assembly according to claim 10, wherein the telescoping member comprises a single monolithic structure or at least two interlinked members.

14. The mud ring assembly according to claim 10, wherein each mounting tab extending from the rectangular or square wall includes an aperture to receive at least a portion of one of the plurality of drive members.

15. The mud ring assembly according to claim 10, wherein each of the plurality of drive members comprises a fastener.

16. A mud ring kit comprising:
an electrical box; and
a mud ring assembly, the mud ring assembly including:
   a base member having a flange and a substantially rectangular or square opening through the flange;
   a raised member extending from the base member, the raised member following the rectangular or square opening in the flange to form a substantially rectangular or square raised wall, the raised member having a plurality of mounting tabs extending from the raised wall toward a center of the rectangular or square opening;
   a telescoping member positioned within the raised member and movable within the raised member between a retracted position and an extended position, the telescoping member having a substantially rectangular or square wall and a plurality of mounting tabs extending from the rectangular or square wall toward a center of the opening, wherein one of the plurality of mounting tabs of the telescoping member is aligned with one of the mounting tabs of the raised member to define a mounting tab pair; and
   a plurality of drive members, wherein one of the plurality of drive members is operatively coupled to the mounting tabs of one of the mounting tab pairs such that rotation of the drive member causes the telescoping member to move between the retracted position and the extended position.

17. The mud ring kit according to claim 16, wherein each of the plurality of mounting tabs extending from the raised wall is substantially perpendicular to the raised wall.

18. The mud ring kit according to claim 16, wherein the raised member is monolithically formed into the base member or secured to the base member.

19. The mud ring kit according to claim 16, wherein each mounting tab extending from the raised wall includes an aperture to receive at least a portion of one of the plurality of drive members.

20. The mud ring kit according to claim 16, wherein the telescoping member comprises a single monolithic structure or at least two interlinked members.

21. The mud ring kit according to claim 16, wherein each of the plurality of mounting tabs extending from the rectangular or square wall is substantially perpendicular to the substantially rectangular or square wall.

22. The mud ring kit according to claim 16, wherein each mounting tab extending from the rectangular or square wall includes an aperture to receive at least a portion of one of the plurality of drive members.

23. The mud ring kit according to claim 16, wherein each of the plurality of drive members comprises a fastener.

24. The mud ring kit according to claim 16, wherein the rectangular or square wall includes a plurality of protective members wherein one of the plurality of protective members is positioned in proximity to one of the mounting tab pairs.

* * * * *